United States Patent [19]

Hulsing, II

[11] Patent Number: 6,079,271
[45] Date of Patent: *Jun. 27, 2000

[54] LOW VIBRATION LINK

[75] Inventor: Rand H. Hulsing, II, Redmond, Wash.

[73] Assignee: L-3 Communications Corporation

[ * ] Notice: This patent is subject to a terminal disclaimer.

[21] Appl. No.: 09/134,810

[22] Filed: Aug. 14, 1998

Related U.S. Application Data

[62] Division of application No. 09/016,186, Jan. 30, 1998, which is a continuation of application No. 08/893,721, Jul. 11, 1997, which is a division of application No. 08/786,185, Jan. 20, 1997, Pat. No. 5,920,011, which is a division of application No. 08/522,812, Sep. 1, 1995, Pat. No. 5,627,314, which is a division of application No. 08/207,328, Mar. 7, 1994, Pat. No. 5,557,046, which is a division of application No. 08/073,818, Jun. 8, 1993, Pat. No. 5,331,854, which is a division of application No. 07/653,533, Feb. 8, 1991, Pat. No. 5,241,861.

[51] Int. Cl.[7] ............... G01P 9/04; G01P 15/08

[52] U.S. Cl. ................ 73/504.04; 73/504.12; 73/514.02

[58] Field of Search ............ 73/504.04, 504.12, 73/504.02, 514.02, 514.29, 514.37, 514.14, 510, 511, DIG. 1

[56] References Cited

U.S. PATENT DOCUMENTS

| | | | |
|---|---|---|---|
| 5,165,279 | 11/1992 | Norling et al. | 73/514.14 |
| 5,241,861 | 9/1993 | Hulsing, II | 73/504.04 |
| 5,331,853 | 7/1994 | Hulsing, II | 73/514.29 |

*Primary Examiner*—Helen C. Kwok
*Attorney, Agent, or Firm*—Theodore J. Mlynar; Whitman Breed Abbott & Morgan LLP

[57] ABSTRACT

A symmetrical link device for linking first and second coplanar devices each movably mounted in a frame such that when one of the first and second coplanar devices is moved, a substantially equal and opposite motion is imparted to the other of the first and second coplanar devices.

21 Claims, 13 Drawing Sheets

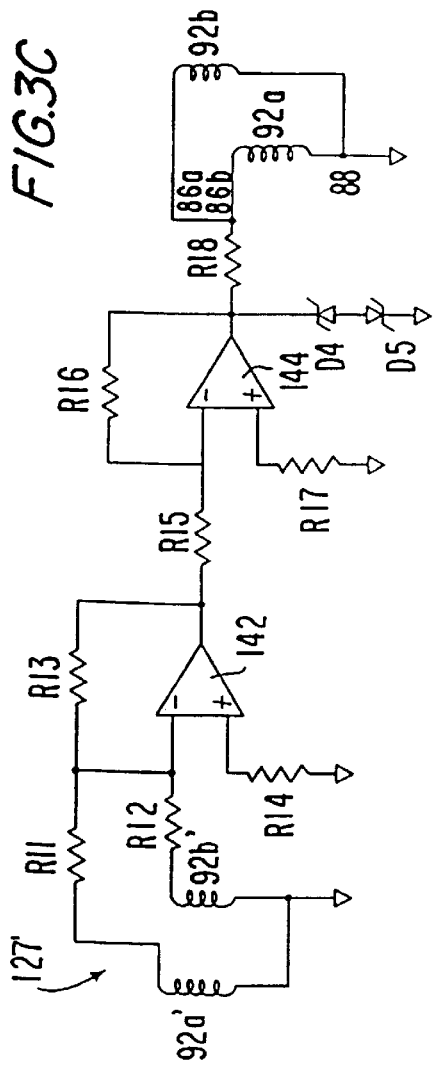
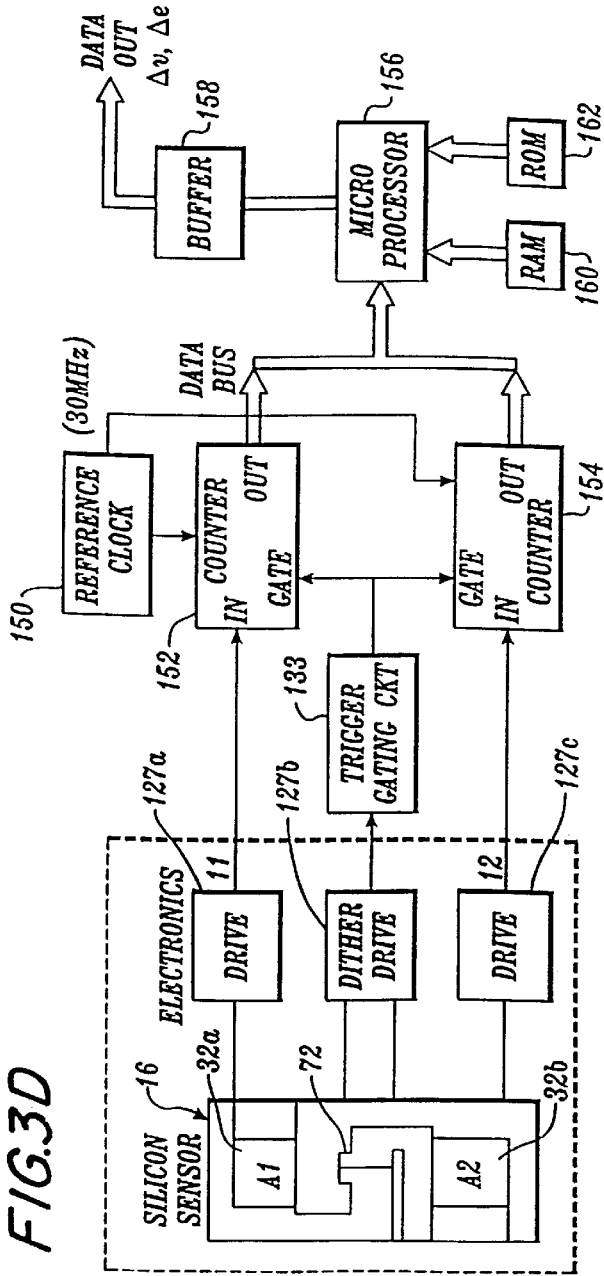

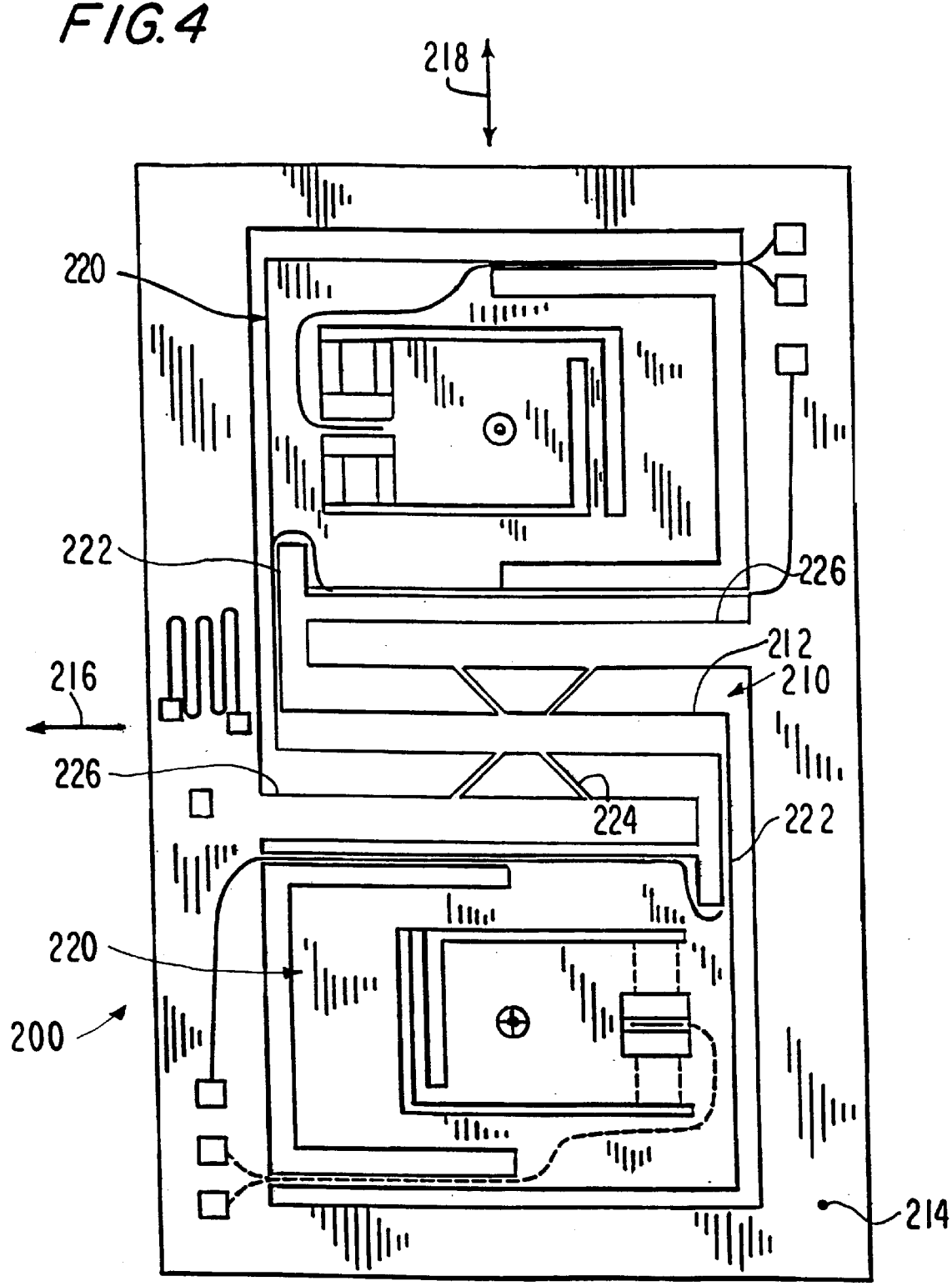

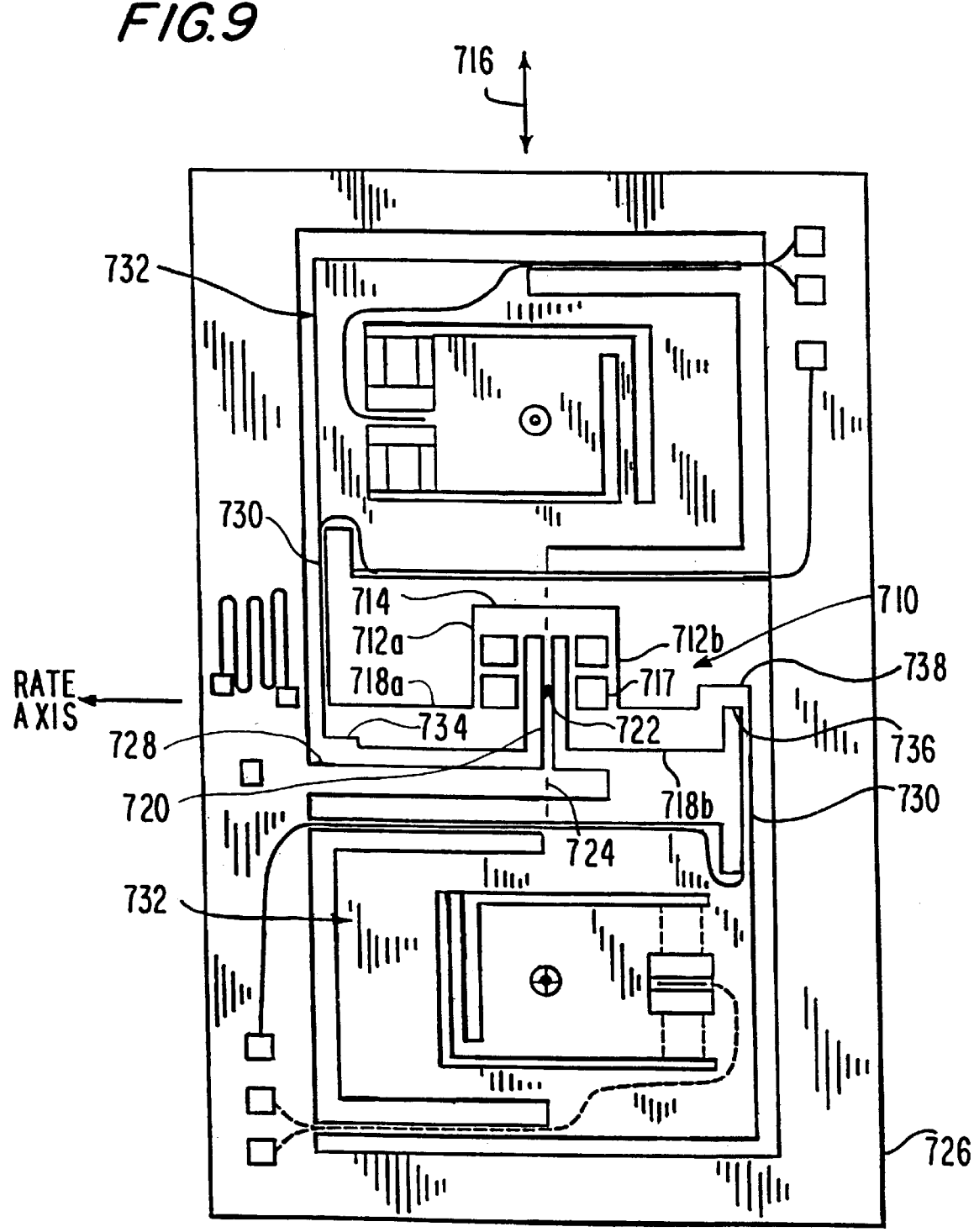

LOW VIBRATION LINK

This application is a Divisional of U.S. application Ser. No. 09/016,186 filed Jan. 30, 1998, which is a Continuation of application Ser. No. 08/893,721 filed Jul. 11, 1997, which is a Divisional of U.S. application Ser. No. 08/786,185 filed Jan. 20, 1997 now U.S. Pat. No. 5,920,011 which is a Divisional of U.S. application Ser. No. 08/522,812 filed Sep. 1, 1995, now U.S. Pat. No. 5,627,314, which is a Divisional of U.S. application Ser. No. 08/207,328 filed Mar. 7, 1994, now U.S. Pat. No. 5,557,046, which is a Divisional of U.S. application Ser. No. 08/073,818, filed Jun. 8, 1993, now U.S. Pat. No. 5,331,854, which is a Divisional of U.S. application Ser. No. 07/653,533, filed Feb. 8, 1991, now U.S. Pat. No. 5,241,861.

FIELD OF THE INVENTION

The invention relates to linkages, in particular to linkages formed between accelerometers in rate sensors.

REFERENCE TO RELATED APPLICATIONS

Reference is made to the following commonly assigned patents:

1) entitled "Monolithic Accelerometer," U.S. Pat. No. 5,165,279 issued on Nov. 24, 1992, in the name of Brian L. Norling;
2) entitled "Accelerometer With Co-Planar Push-Pull Force Transducers," U.S. Pat. No. 5,005,413 issued on Apr. 9, 1991, in the name of Mitch Novack;
3) entitled "Coriolis Inertial Rate and Acceleration Sensor," U.S. Pat. No. 5,168,756 issued on Dec. 8, 1992, in the name of Rand H. Hulsing II;
4) entitled "Torque Coil Stress Isolator," U.S. Pat. No. 5,111,694 issued on May 12, 1992, in the name of Steven Foote;
5) entitled "Micromachined Rate And Acceleration Sensor," U.S. Pat. No. 5,627,314 issued on May 6, 1997, in the name of Rand H. Hulsing II;
6) entitled "Micromachined Rate And Acceleration Sensor," U.S. Pat. No. 5,557,046 issued on Sep. 17, 1996, in the name of Rand H. Hulsing II;
7) entitled "Micromachined Rate And Acceleration Sensor Having Vibrating Beams," U.S. Pat. No. 5,331,854 issued on July 26, 1994, in the name of Rand H. Hulsing
8) entitled "Micromachined Rate And Acceleration Sensor," U.S. Pat. No. 5,241,861 issued on Sep. 7, 1993, in the name of Rand H. Hulsing II;
9) entitled "Micromachined Rate And Acceleration Sensor," U.S. application Ser. No. 08/893,721 filed Jul. 10, 1997, in the name of Rand H. Hulsing II; and
10) entitled "Micromachined Rate And Acceleration Sensor," U.S. application Ser. No. 08/786,185 filed Jan. 20, 1997, in the name of Rand H. Hulsing II all of which are incorporated herein by reference.

BACKGROUND OF THE INVENTION

The rate of rotation of a moving body about an axis may be determined by mounting an accelerometer on a frame and dithering it, with the accelerometer's sensitive axis and the direction of motion of the frame both normal to the rate axis about which rotation is to be measured. For example, consider a set of orthogonal axes X, Y and Z oriented with respect to the moving body. Periodic movement of the accelerometer along the Y axis of the moving body with its sensitive axis aligned with the Z axis results in the accelerometer experiencing a Coriolis acceleration directed along the Z axis as the moving body rotates about the X axis. A Coriolis acceleration is that perpendicular acceleration developed while the body is moving in a straight line, while the frame on which it is mounted rotates. This acceleration acting on the accelerometer is proportional to the velocity of the moving sensor body along the Y axis and its angular rate of rotation about the X axis. An output signal from the accelerometer thus includes a DC or slowly changing component or force signal F representing the linear acceleration of the body along the Z axis, and a periodic component or rotational signal $\Omega$ representing the Coriolis acceleration resulting from rotation of the body about the X axis.

The amplitude of that Coriolis component can be produced by vibrating the accelerometer, causing it to dither back and forth along a line perpendicular to the input axis of the accelerometer. Then, if the frame on which the accelerometer is mounted is rotating, the Coriolis acceleration component of the accelerometer's output signal will be increased proportional to the dither velocity. If the dither amplitude and frequency are held constant, then the Coriolis acceleration is proportional to the rotation rate of the frame.

The linear acceleration component and the rotational component representing the Coriolis acceleration may be readily separated by using two accelerometers mounted in back-to-back relationship to each other and processing their out put signals by sum and difference techniques. In U.S. Pat. No. 4,510,802, assigned to the assignee of this invention, two accelerometers are mounted upon a parallelogram with their input axes pointing in opposite directions. An electromagnetic D'Arsonval coil is mounted on one side of the parallelogram structure and is energized with a periodically varying current to vibrate the accelerometers back and forth in a direction substantially normal to their sensitive or input axis. The coil causes the parallelogram structure to vibrate, dithering the accelerometers back and forth. By taking the difference between the two accelerometer outputs, the linear components of acceleration are summed. By taking the sum of the two outputs, the linear components cancel and only the Coriolis or rotational components remain.

U.S. Pat. No. 4,509,801, commonly assigned to the assignee of this invention, describes the processing of the output signals of two accelerometers mounted for periodic, dithering motion to obtain the rotational rate signal $\Omega$ and the force or acceleration signal F representing the change in velocity, i.e. acceleration of the moving body, along the Z axis. U.S. Pat. No. 4,510,802, commonly assigned to the assignee of this invention, describes a control pulse generator, which generates and applies a sinusoidal signal of a frequency $\omega$ to the D'Arsonval coil to vibrate the parallelogram structure and thus the first and second accelerometer structures mounted thereon, with a dithering motion of the same frequency $\omega$. The accelerometer output signals are applied to a processing circuit, which sums the accelerometer output signals to reinforce the linear components indicative of acceleration. The linear components are integrated over the time period T of the frequency $\omega$ corresponding to the dither frequency to provide the force signal F, which represents the change in velocity, i.e. acceleration, along the Z axis. The accelerometer output signals are also summed, whereby their linear components cancel and their Coriolis components are reinforced to provide a signal indicative of frame rotation. That difference signal is multiplied by a zero mean periodic function sgnc $\omega$t. The resulting signal is integrated over a period T of the frequency ω by a sample and hold circuit to provide the signal Ω representing the rate of rotation of the frame.

The D'Arsonval coil is driven by a sinusoidal signal of the same frequency ω which corresponded to the period T in which the linear acceleration and Coriolis component signals were integrated. In particular, the pulse generator applies a series of pulses at the frequency ω to a sine wave generator, which produces the substantially sinusoidal voltage signal to be applied to the D'Arsonval coil. A pair of pick-off coils produce a feedback signal indicative of the motion imparted to the accelerometers. That feedback signal is summed with the input sinusoidal voltage by a summing junction, whose output is applied to a high gain amplifier. the output of that amplifier in turn is applied to the D'Arsonval type drive coil. The torque output of the D'Arsonval coil interacts with the dynamics of the parallelogram structure to produce the vibrating or dither motion. In accordance with well known servo theory, the gain of the amplifier is set high so that the voltage applied to the summing junction and the feedback voltage are forced to be substantially equal and the motion of the mechanism will substantially follow the drive voltage applied to the summing junction.

U.S. Pat. No. 4,881,408 describes the use of vibrating beam force transducers in accelerometers. In U.S. Pat. No. 4,372,173, the force transducer takes the form of a double-ended tuning fork fabricated from crystalline quartz. The transducer comprises a pair of side-by-side beams which are connected to common mounting structures at their ends. Electrodes are deposited on the beams and a drive circuit applies a periodic voltage signal to the electrodes causing the beams to vibrate toward and away from one another, 180 degrees out of phase. In effect, the drive circuit and beams form an oscillator with the beams playing the role of a frequency controlled crystal, i.e. the mechanical resonance of the beams controls the oscillation frequency. The vibrating beams are made of crystalline quartz, which has piezo-electric properties. Application of periodic drive voltages to such beams cause them to vibrate toward and away from one another, 180 degrees out of phase. When the beams are subjected to accelerating forces, the frequency of the mechanical resonance of the beams changes, which results in a corresponding change in the frequency of the drive signal. When subjected to acceleration forces that cause the beams to be placed in tension, the resonance frequency of the beams and thus the frequency of the drive signal increases. Conversely, if the beams are placed in a compression by the acceleration forces, the resonance frequency of the beams and the frequency of the drive signal is decreased.

Above referenced U.S. Pat. No. 5,005,413 describes accelerometers using vibrating force transducers require materials with low internal damping, to achieve high Q values that result in low drive power, low self-heating and insensitivity to electronic component variations. Transducer materials for high-accuracy instruments also require extreme mechanical stability over extended cycles at high stress levels. Crystalline silicon posses high Q values, and with the advent of low cost, micromachined mechanical structures fabricated from crystalline silicon, it is practical and desirable to create vibrating beams from a silicon substrate. Commonly assigned U.S. Pat. No. 4,912,990 describes a vibrating beam structure fabricated from crystalline silicon and including an electric circuit for applying a drive signal or current along a current path that extends in a first direction along a first beam and in a second, opposite direction along a second beam parallel to the first. A magnetic field is generated that intersects substantially perpendicular the conductive path, whereby the first and second beams are caused to vibrate towards and away from one another, 180 degrees out of phase.

Digital techniques employ stable, high frequency crystal clocks to measure a frequency change as an indication of acceleration forces applied to such vibrating beam accelerometers. To ensure precise integration or cosine demodulation, a crystal clock is used to set precisely the frequency of the dither drive signal. Outputs from two accelerometers are fed into counters to be compared to a reference clock signal produced by the crystal clock. A microprocessor reads the counters and processes the data to provide a force signal F and a rotational signal Ω. The main advantage of digital processing is the ability to demodulate with extreme precision. The short term stability of the reference crystal clock allows the half cycle time basis to be precisely equal. Thus a constant input to the cosine demodulator is chopped up into equal, positive half cycle and negative half cycle values, whose sum is exactly zero.

In an illustrative embodiment, the two accelerometers signals are counted in their respective counters over 100 Hz period (corresponding to a 100 Hz of the dither frequency ω) and are sampled at a 400 Hz data rate corresponding to each quarter cycle of the dither motion. The two accumulated counts are subtracted to form the force signal F. Since the counters act as an integrator, the acceleration signal is changed directly to a velocity signal. Taking the difference of the acceleration signals tends to reject all Coriolis signals as does the counter integration and locked period data sampling.

The Coriolis signals are detected by a cosine demodulation. The cosine demodulated signals from the first and second accelerometers are summed to produce the Δθ signal. Again, the counters integrate the rate data to produce an angle change. The sum also eliminates any linear acceleration and the demodulation cancels any bias source including bias operating frequency and accelerometer bias. The accelerometer temperature is used in a polynomial model to provide compensation for all the coefficients used to convert the frequency counts into output units. Thus, the scale factor, bias and misalignment of the sensor axes are corrected over the entire temperature range.

The demodulation of the frequency sample is straightforward once the data is gathered each quarter cycle. The cosine demodulation is simply the difference between the appropriate half cycles. The linear acceleration is the sum of all samples.

The state of the art in micromachined rate and acceleration sensors is represented by U.S. Pat. No. 5,341,682 which is commonly assigned to the assignee of the present invention and incorporated herein by reference. The rate of rotation of a moving body about an axis may be determined by mounting an accelerometer on a frame and dithering it, with the accelerometer's sensitive axis and the direction of motion of the frame both normal to the rate axis about which rotation is to be measured. A Coriolis acceleration is the measure of the acceleration developed while the body is moving in a straight line and the frame upon which it is mounted rotates about the rate axis. The amplitude of the Coriolis component can be produced by vibrating or dithering the accelerometer, causing it to dither back and forth along a line perpendicular to the input axis of the accelerometer. When the frame upon which the accelerometer is mounted is rotated, the Coriolis acceleration component of the accelerometer's output signal increases in proportion to the dither velocity.

The linear acceleration component and the rotational component representing the Coriolis acceleration may be readily separated by using two accelerometers mounted in back-to-back relationship to each other and processing their output signals by sum and difference techniques as described in U.S. Pat. No. 4,590,801, which is commonly assigned to the assignee of the present invention and incorporated herein by reference.

Rate and acceleration sensors, for example, U.S. Pat. No. 5,341,682, are comprised of two accelerometers aligned in a single plane such that the input or sensitive axes of the two accelerometers are parallel and the output or hinge axes of the two accelerometers are parallel. The two accelerometers are vibrated or dithered at a predetermined frequency along a dither axis parallel to the hinge axes. The two accelerometers tend to vibrate at slightly different frequencies due to slight mass mismatch. Even if driven by a drive signal of common frequency, the accelerometer motions tend to be out of phase with each other. A link is connected to each of the two accelerometers whereby motion imparted to one accelerometer results in like but opposite motion imparted to the other accelerometer. Thus, the dithering motion imparted to one accelerometer is ideally of the exact same frequency and precisely 180 degrees out of phase with that applied to the other accelerometer.

The link provides an interconnect between the two accelerometers which is stiff in the dither axis such that the motion imparted to one accelerometer is effectively transmitted to the other accelerometer and both accelerometers ideally dither at the same frequency and precisely 180 degrees out of phase. The link is pivotally fixed to the frame by a pivot flexure. The link is further connected to each of the two accelerometers by flexures. The link is typically formed in a complex asymmetric shape. The complexity of the link is driven by practical considerations involved in adapting the link to accommodate both the pivot flexure and the two link-to-accelerometer flexures. The link's complex asymmetric shape provides adequate clearance between the link and the frame for the pivot flexure. The link's shape also provides adequate clearance between the link and each accelerometer to provide the precise flexure length to ensure that the flexures exhibit a predetermined mix of simple arc bending and "S-bend" motion and to ensure that any motion imparted to one accelerometer by the flexures is imparted to the other accelerometer as a sinusoidal function without introducing a higher order harmonic into the translation motion.

Although the existing device functions for the purposes intended, its exact behavior is difficult to predict and/or model analytically. For example, the complex shape of prior links results in spring rates which are asymmetrical and a shape which is difficult to solve analytically. Additionally, constructing the shape previously taught results in flexures whose thicknesses and hence vibration properties are difficult to control.

SUMMARY OF THE INVENTION

The present invention provides a linkage between accelerometers in a micromachined rate and acceleration sensor which is relatively simple to solve analytically and results in flexures whose thicknesses are relatively insensitive to process variations. For example, according to one aspect of the present invention, the link shape can be solved using classical mechanical equations. According to another aspect of the invention, the present invention provides a shape which is relatively insensitive to process variations by providing a relatively simple shape having a symmetrical configuration.

According to one aspect of the present invention, the present invention provides a simple symmetrically shaped link having sufficient mechanical stiffness in the to effectively transmit motion imparted to one accelerometer to the other accelerometer such that both accelerometers dither at the same frequency and precisely 180 degrees out of phase.

According to another aspect of the present invention, the present invention provides a simple symmetrical link which provides adequate clearance between the link and each accelerometer for flexures having a length which ensures that the flexures exhibit a predetermined mix of simple arc bending and "S-bend" motion and which ensures that any motion imparted to one accelerometer by the flexures is imparted to the other accelerometer as a sinusoidal function without introducing a higher order harmonic into the translation motion.

According to yet another aspect of the present invention, the present invention provides a simple symmetrical link having reduced sensitivity to vibration in the dither cross-axis by providing, for example, a simplified columnar shaped. According to still another aspect of the invention, the present invention provides a simple symmetrical link having reduced sensitivity to cross-axis vibration by providing, for example, a link having a columnar shape in the dither cross-axis.

BRIEF DESCRIPTION OF THE DRAWINGS

FIG. 3C is a circuit diagram of a second embodiment of an oscillator circuit for sensing signals derived from the pick-off coils disposed on the accelerometers shown in FIG. 2A for providing drive signals to the coils of these accelerometers to effect the dither motion thereof;

FIG. 3D is a functional block diagram illustrating the processing of the output signals from the first and second accelerometers formed within the silicon substrate of FIG. 2A and, in particular, illustrates how a pair of counters are gated to effectively demodulate the accelerometer output signals to provide an indication of the specific force and angular rotation rate of the moving body;

FIG. 4 is a plan view of an 'X' shaped link according to one embodiment of the present invention;

FIG. 9 is a plan view of a mass reduced 'U' shaped link according to another embodiment of the present invention.

DETAILED DESCRIPTION OF THE PREFERRED EMBODIMENT (S)

Figure 1A:
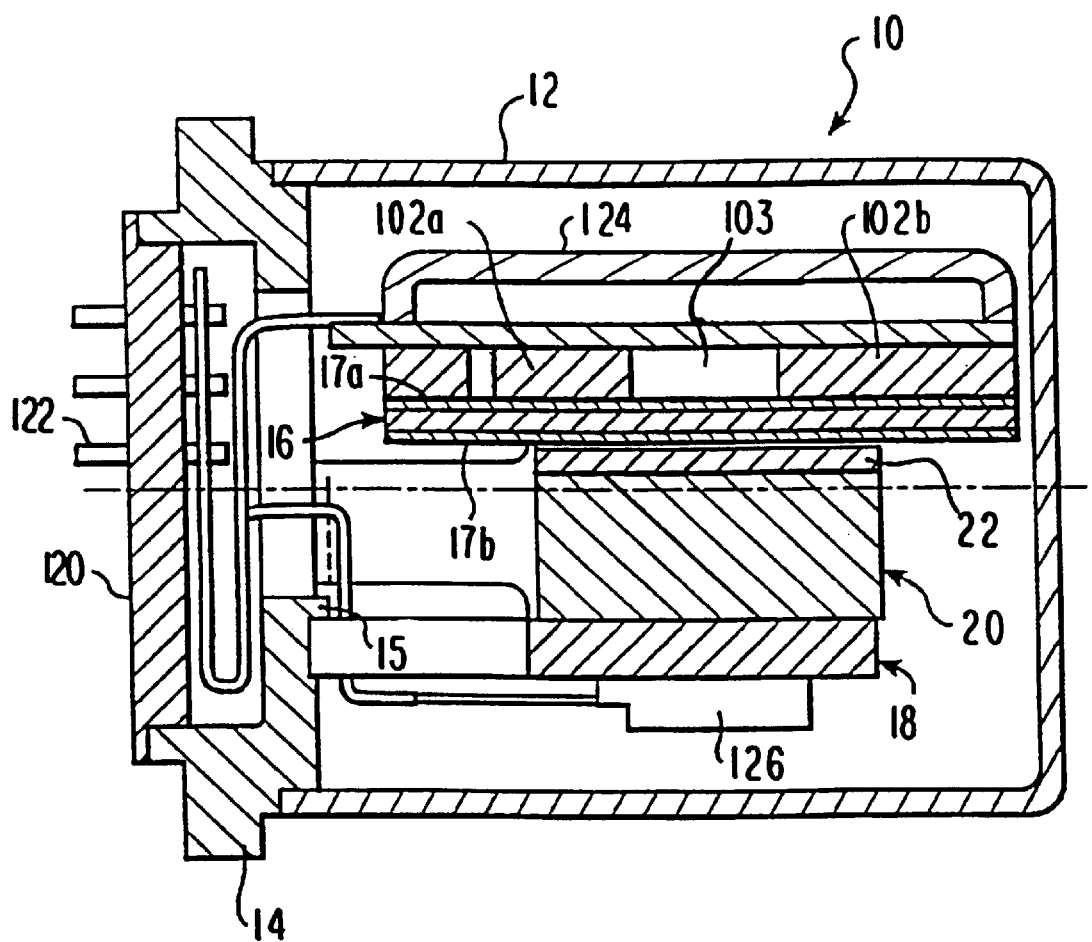
FIG. 1A is a perspective view illustrating the rate and acceleration sensor of this invention.

Referring now to the drawings, FIGS. 1A, B, C and D show the arrangement of a rate and acceleration sensor 10 according to the present invention. The sensor 10 includes a shell 12 housing a unitary substrate 16, which is illustratively made of silicon and in which is formed, illustratively by micro-machining, a pair of accelerometers 32a and 32b disposed in side-by-side relation such that their input axes 38a and 38b are disposed in opposite directions (see FIG. 1D), a unitary magnet 20 and a flux path assembly 18, which provides a magnetic path for directing the flux emanating from the magnet 20 through the substrate 16 and its first and second accelerometers 32a and b. As will be explained, the configuration and disposition of the accelerometers 32a and b within the substrate 16 permits a simple, straightforward magnetic flux path to effect the operation of the dithering motion and the vibration of a sensor element of the accelerometers 32a and b.

Figure 2A:
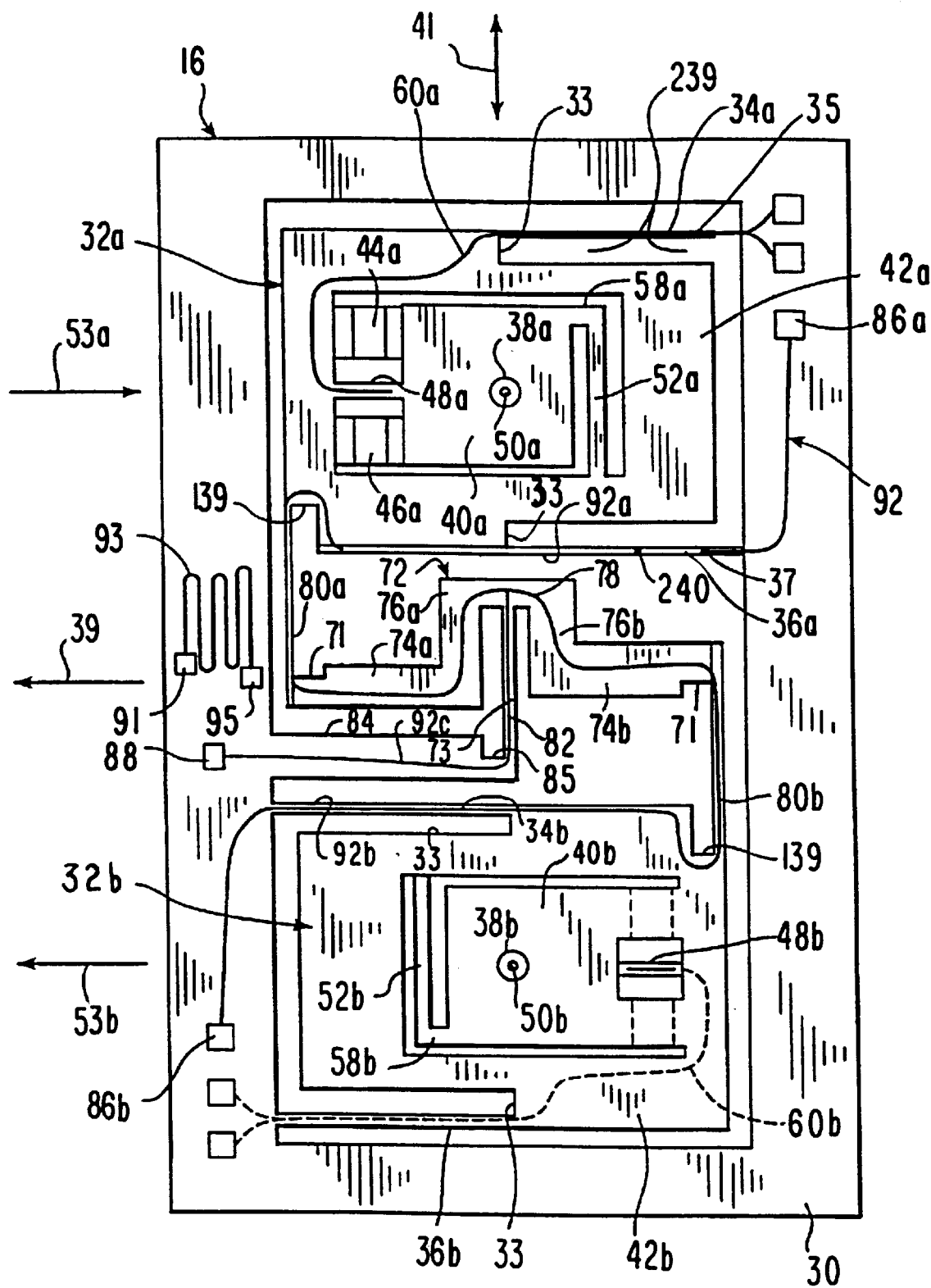
FIG. 2A is a top plan view of the unitary substrate out of which are formed a pair of accelerometers disposed in a side-by-side relationship with their input axes pointing in opposite directions, as shown in FIGS. 1B, 1C and 1D.

Referring now to FIG. 2A, the details of the substrate 16 are shown. The first and second accelerometers 32a and b are micromachined from the unitary, silicon substrate 16 so that their input axes 38a and 38b are disposed in parallel but opposite directions. In FIG. 2A, the input axis 38a of the accelerometer 32a is disposed out of the page, whereas the input axes 38b of the accelerometer 32b is disposed into the page. Further, the input axes 38a and b are disposed perpendicular to a dither or vibration axis 41 and to a rate axis 39, As is well known in the art, the accelerometers 32a and b will respond to linear acceleration along their input axes 38a and b, respectively, and to rotation of the substrate 16 about its rate axis 39.

The substrate 16 includes a dither or mounting frame 3o from which each of the accelerometers 32a and b is suspended respectively by a pair of flexures 34 and 36, which upon application of a dithering force vibrate with an "S bend" motion to translate the accelerometers 32a and b in a predominantly linear relationship with each other. As will be further described, a periodic drive signal or current is applied via the external connectors 86a and b to a conductor or conductive path 92. The magnet 20 emanates a magnetic field substantially perpendicular to the surface of the substrate 16, whereby the accelerometers 32a and b are subjected to a periodic dithering motion along their dither axis 41.

A link 72 is connected to the unsupported end of each accelerometer 32 to insure that the dithering motion imparted to one of the accelerometers 32a will be of the exact same frequency and in phase with that applied to the other accelerometer 32b. Without a link 72 therebetween, the accelerometers 32a and b would tend to vibrate at slightly different frequencies due to slight mass mismatch. Even if driven by a drive signal of common frequency, the accelerometer motions would tend to be out of phase with each other. The link 72 is connected by a flexure 80a to the free moving end of the first accelerometer 32a opposite to the flexures 34a and 36a, which mount the accelerometer 32a to the dither frame 30.

The link 72 resembles a lever pivotally mounted above a pivot point 73 provided by a pivot flexure 82. The link 72 includes first and second lever arms 74a and b extending in opposite directions from the pivot point 73. The second lever arm 74b is connected by a flexure 80b to the free moving end of the accelerometer 32b opposite to its end connected by the it flexures 34b and 36b to the dither frame 30. The link 72 includes a pair of parallel members 76a and 76b interconnecting the pivot arms 74a and 74b to a brace 78 connected to the pivot flexure 82. In turn, the pivot flexure 82 is mounted along a center axis of the substrate 16 by a support member 84, which is in turn affixed to the dither frame 30.

Figure 2B:
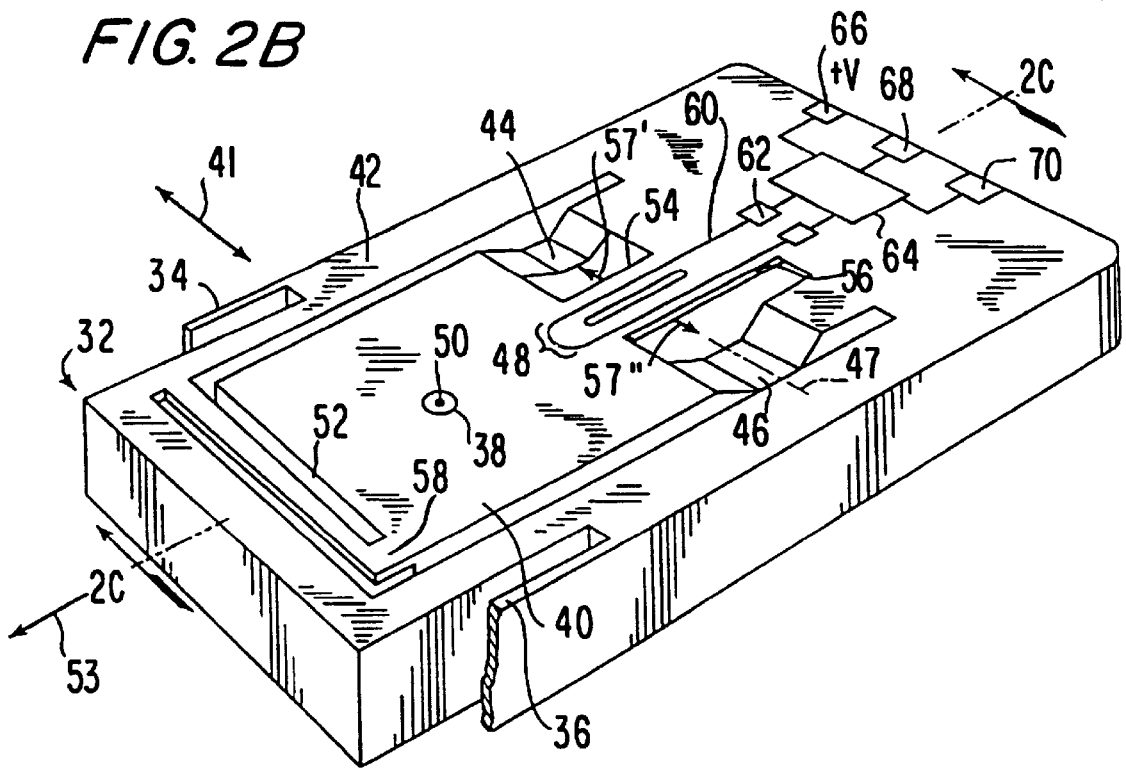
FIG. 2B is a perspective view of one of the accelerometers formed in the substrate as shown in FIG. 2A.
Figure 2C:
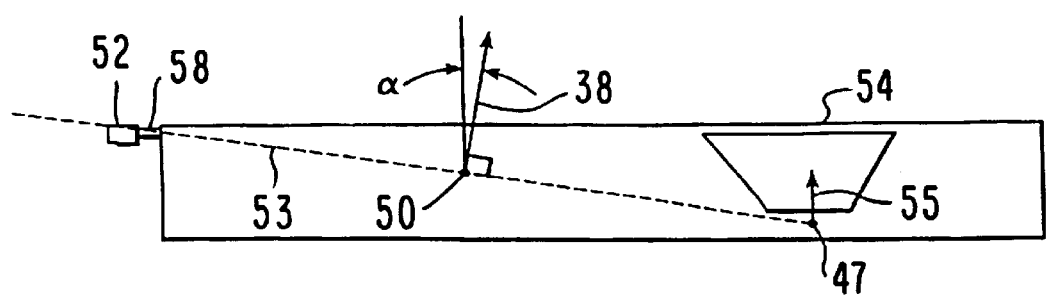
FIG. 2C is a cross-sectional view of the substrate and its accelerometer as taken along the line 2C—2C of FIG. 2B.

As more fully shown in FIG. 28, each accelerometer 32 includes an element 48 sensing the acceleration imposed on the sensor 10 and including a pair of vibrating beams 54 and 56, which are driven to vibrate in opposite directions as indicated by the arrows 57' and 57", respectively. It will be appreciated that the arrows 57' and 57" are aligned in a parallel relationship with the dither axis 41 and are disposed perpendicular to the input axes 38a and b and to the rate axis 39 (see FIG. 2A). One end of each of the vibrating beams 54 and 56 is affixed in a relatively stationary relationship to an accelerometer support frame 42. The remote ends of the vibrating beams 54 and 56 are connected to a proof mass 40, which is suspended by a pair of hinges 44 and 46 to the frame 42. As shown in FIG. 2B, the hinges 44 and 46 define a hinge axis 47 about which the proof mass 40 rotates when accelerating forces are applied along the input axis 38 of each accelerometer 32, its proof mass 40 tends to pivot about its hinge axis 47. The opposite end of the proof mass 40 is pliantly or flexibly connected to the accelerometer support frame 42 by a strut 52 of reduced cross-section, whereby the proof mass 40 is free to move along its input axis 38. As shown in FIG. 2C, the hinges 44 and 46 are formed by micromachining the silicon substrate 16 into a relatively thin flexure with respect to the width of the support frame 42, whereby the proof mass 40 is permitted to pivot about the hinge axis 47.

As shown in FIGS. 2A, B and C, each of the accelerometers 32a and b has a corresponding strut 52a or b, which tends to dampen or attenuate extraneous movements applied to the proof masses 40a or b. A pendulous axis 53 is associated with each of accelerometers 32 and its proof mass 40. As best shown in FIG. 2C, each proof mass 40 has a center of gravity 50. The input axis 38 of each accelerometer 32 intersects the center of gravity 50 and is disposed perpendicular to the pendulous axis 53. The pendulous axis 53 passes through the center of gravity 50, the hinge axis 47 and the strut 52. In an illustrative embodiment of this invention, the input axis 38 is tilted at an acute angle of approximately 80 with respect to the unitary substrate 16 and its support frame 42. Also the dither axis 41 intersects the centers of gravities 56a and b of both accelerometers 32a and b and is perpendicular to their input axes 38a and b. Undesired moments may be produced by acceleration forces acting along the hinge axis 47 to develop moments about the pendulous axis 53 equal to the product of such forces times a moment arm or equivalent radius of rotation 55 corresponding to the vertical distance between the rate axis 47 and the center of gravity 50. In a preferred embodiment, each strut 52 is made of reduced cross sectional dimensions, e.g., 1 millinch square. A foot 58 is disposed at right angles to the strut 52 to interconnect the end of the strut 52 to the proof mass 40. One end of the strut 52 is connected to an innerperipheral edge of the accelerometer support frame 42, and its foot 58 is connected to an edge of the free end of the proof mass 40 remote from its hinges 44 and 46 and its hinge axis 47. By maximizing the length of the strut 52, its spring rate is reduced to provide maximum flexibility of the strut 52. The foot 58 is so configured and dimensioned to render it relatively flexible, so that the foot 58 will "S-bend" to allow rotation of the proof mass 40 substantially only about its hinge axis 47.

The vibrating beams 54 and 56 are also machined from the substrate 16 but on a surface of the substrate 16 opposite to that of the hinges 44 and 46. Thus, as acceleration forces cause the proof mass 40 to rotate upwardly as shown in FIG. 2C, both of the vibrating beams 54 are put into compression, whereas when the proof mass 40 is pivoted downwardly as shown in FIG. 2C, both the vibrating beams 54 and 56 are placed in tension. When the vibrating beams 54 and 56 are placed in tension, the frequency of their natural vibration increases, and when put into compression, that frequency decreases.

As shown in FIGS. 2A and B, a drive signal or current is applied via connector pads 62 via a conductive path or conductor 60 that extends in a first direction along the vibrating beam 54 and in a second, opposite direction along the vibrating beam 56, whereby in the presence of a magnetic field as generated by the magnet 20, the vibrating beams 54 and 56 vibrate in opposite directions. A drive circuit 64 is incorporated in the accelerometer support Frame 42 to provide the current to the conductor 60. The drive circuit 64 also provides an output to the external connector path 70, indicative of the frequency at which the vibrating beams 54 and 56 are vibrating.

Figure 1B:
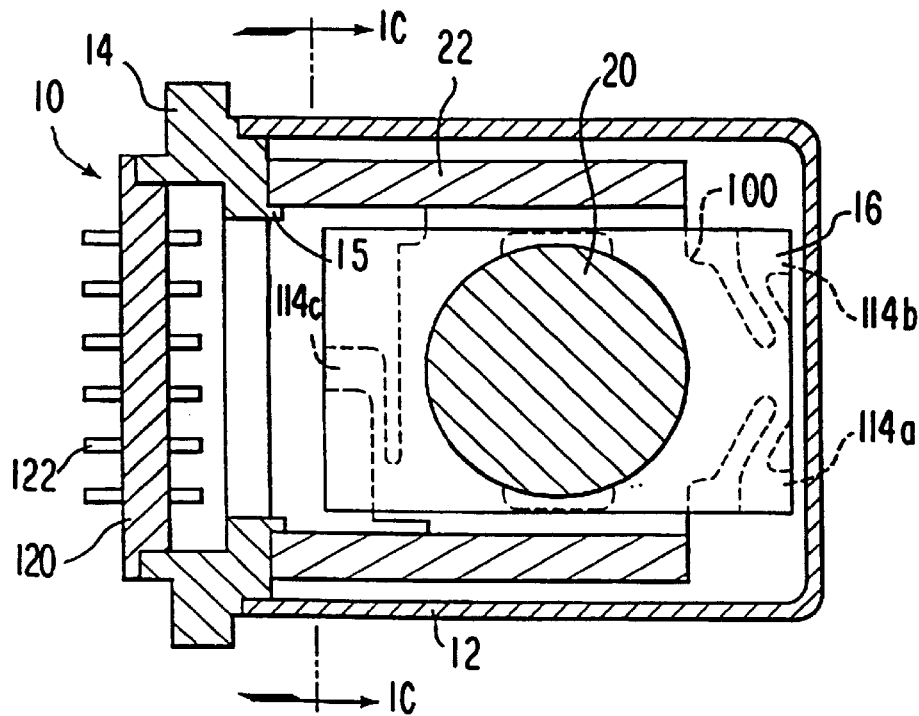
FIG. 1B is a side, cross-sectional view illustrating the rate and acceleration sensor of this invention, rotated 90 degrees from view the in FIG. 1A.
Figure 1C:
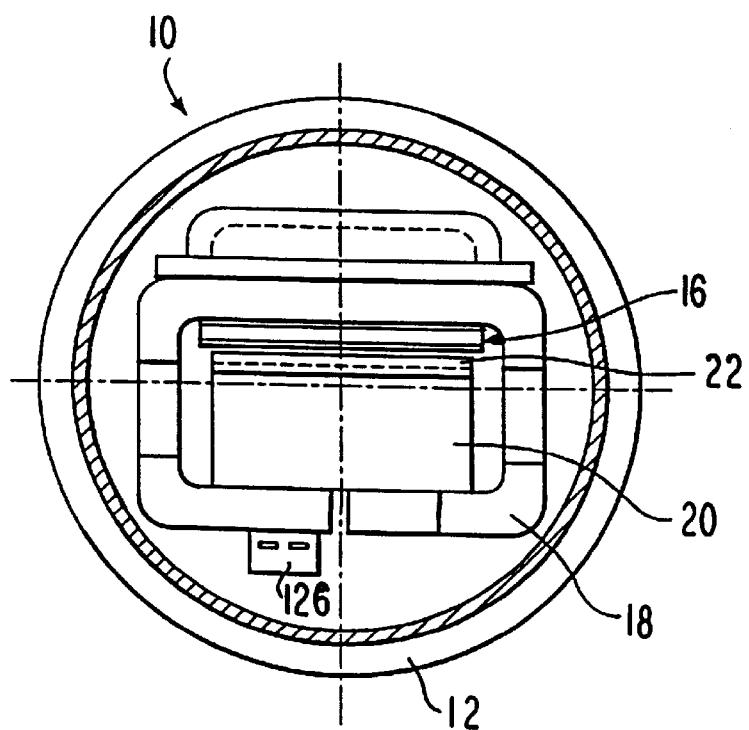
FIG. 1C is a cross-sectional, side view taken along line 1C—1C of FIG. 1B.
Figure 1D:
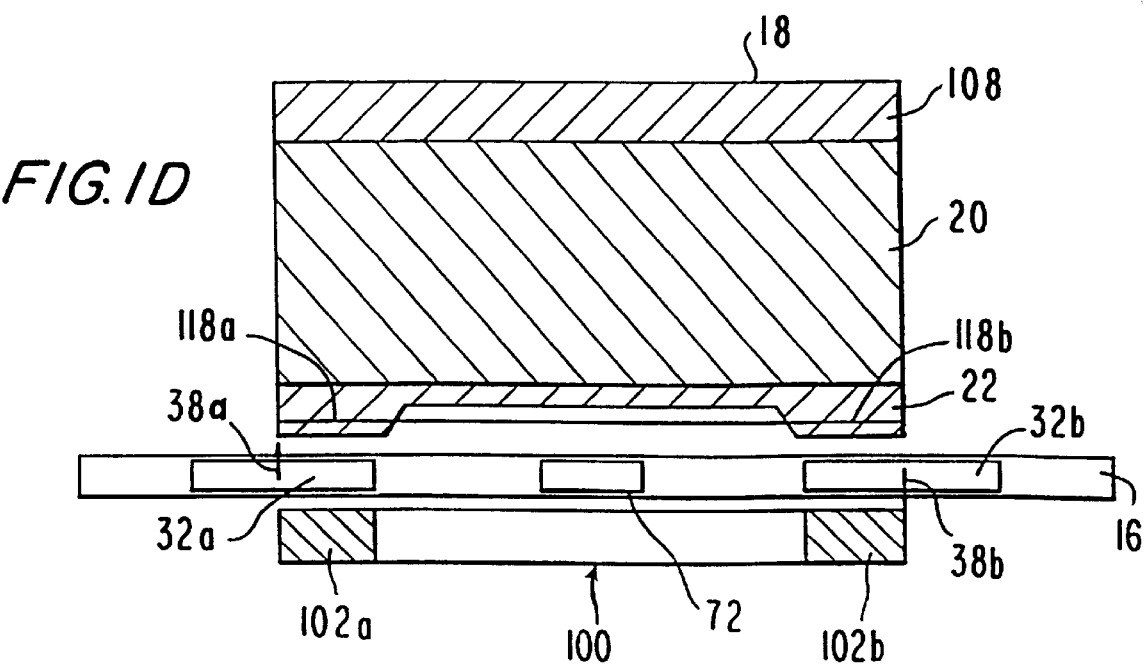
FIG. 1D is a bottom plan view of the sensor shown in FIGS. 1A and B.
Figure 1E:
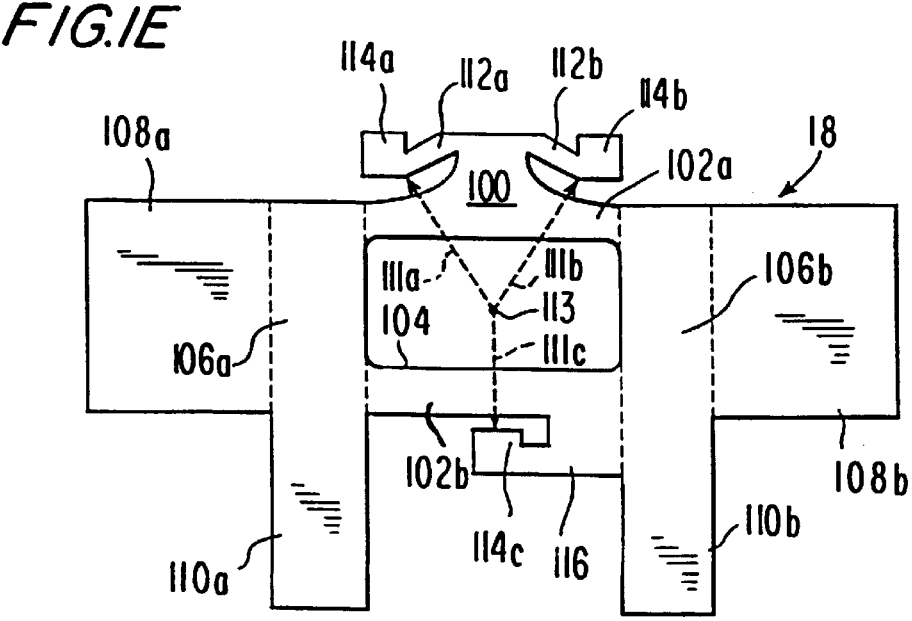
FIG. 1E is a top plan view of the flux path assembly included within the sensor as shown in FIGS. 1B, C and D.

A significant advantage of this invention resides in the placement of the first and second accelerometers 32a and b within the silicon substrate 16, whereby a single magnet 20 may be employed to direct magnetic flux through each of the accelerometers 32a and b for the dual purposes of imparting the dithering motion to the accelerometers 32a and b, and imparting a vibrating motion to the sensor elements 48 in the form of the vibrating beams 54 and 56. FIG. 1E shows the flux path assembly 18 in its flat state, before it is folded into the configuration shown in FIG. 1D. The assembly 18 supports and retains the substrate 16, a pole piece 22 and the magnet 20 in the positions as shown in FIGS. 1C and D, and includes a bottom member 100, opposing side members 106a and 106b and top members 108a and b. In turn, the assembly 18 is supported within the housing cover 12 by a pair of support legs 110a and b, which extend downward to mate with a housing ring 14 and, in particular, a projection 15, whereby the assembly 18 is securely held within the assembled housing cover 12 and base 14.

As particularly shown in FIG. 1C, the assembly 18 provides a flux path therethrough for the flux emanating from the magnet 20, and concentrated or focused by the pole piece 22 to pass primarily through the first and second accelerometers 32a and b, before the flux returns into the restricted legs 102a and b. Thereafter, the flux passes through the side members 106a and b and their respective top members 108a and b and into the magnet 20 to complete the flux path. The structure described, and in particular the pole piece 22 and the restricted legs 102a and b, concentrate the flux to pass primarily through the accelerometers 32a and b, such that when drive signals are applied to pass through the conductors 92 and 60, a dither motion is imparted to the accelerometers 32a and b, and a natural vibration motion is imparted to the vibrating beams 54a and b, and 56a and b. The pole piece 22 has a pair of projections 118a and b of approximately the same dimensions as the corresponding cross-sectional areas of the accelerometers 32a and b such that the flux passes primarily through the accelerometers 32a and b. As shown particularly in FIGS. 1A and E, the restricted legs 102 form an opening 104 therethrough in which only a nominal flux appears, it being understood that most of the flux is concentrated to pass through the legs 102a and b. It is estimated that this configuration of the flux path assembly 18 doubles the strength of the flux passing through the accelerometers 32a and b, thus increasing proportionally the voltage appearing on the pickup coils and, thus, reducing the gain of that drive circuit 127' to be explained with respect to FIG. 3C. Thus, because of the placement of accelerometers 32a and b in a side-by-side relationship within a single substantially planar substrate 16, a single magnet 20 and a simple flux path assembly 18 may be employed to provide the magnetic flux to effect efficiently both the dithering and vibrating motion of accelerometers 32a and b.

As shown in FIG. 2A, the conductive path 92 is deposited on the top surface of the substrate 16 and extends from the external connector 86a down a leg of the dither frame 30, horizontally across the flexure 36a and the bottom peripheral edge of the accelerometer 32a, down the vertical flexure 80a, across the link arms 74a and 74b, down the vertical flexure 80b, across the upper peripheral edge of accelerometer 32b and its flexure 34b, and down the opposing leg of the dither frame 30 to the external connector 86b. The conductive path 92 has a center point, which is connected by a conductive path 92c and a ground terminal 88 to ground. In order to maximize the efficiency of generating the dither motion, the conductive path 92 follows a path along the bottom portion of accelerometer 32a and its flexure 36a and the upper portion of the accelerometer 32b and its flexure 34b, which portions are closest to the center of the substrate 16, whereby the magnetic flux emanating from the magnet 20 and focussed by the pole piece 22 and its projections 118a and b, is concentrated to pass through these portions of the conductive path 92. The conductive path 92 includes a first effective portion identified by the numeral 92a mounted on the flexure 36a and the bottom of the accelerometer frame 42a of the accelerometer 32a and a second effective portion 92b similarly but oppositely mounted on the accelerometer 32b, both effective portions 92a and b disposed within the concentrated magnetic flux produced by the magnet 20 and its pole piece 22. By so configuring the conductive path 92 and its effective portions 92a and b, the driving force of the dither motion is maximized.

As shown in FIG. 1A, the substrate 16 is provided with a pair of dust covers 17a and b disposed respectively upon the opposing surfaces of the substrate 16. The dust covers 17a and b may also be made of silicon and serve to protect the accelerometers 32a and b from dust. Illustratively, the inner surfaces of the dust covers 17a and b are recessed (not shown in the drawings) to permit movement of the proof masses 40a and b and to provide stops for them.

As described above, the input axis 38 is oriented at an acute angle with respect to a line perpendicular to the surface of the substrate 16. In an illustrative embodiment of this invention, the assembly 18 mounts the substrate 16 at a compensating angle with respect to the axis of the housing shell 12, whereby the sensor 10 and thus, the input axes 38 of the accelerometers 32a and b may be precisely oriented with respect to the vehicle or aircraft carrying the sensor 10 of this invention. The substrate 16 is mounted on a plurality of pads 114. A pair of support arms 112a and b extend from the leg 102a to support the corners of the lower surface (as seen in FIG. 1E) of the substrate 16. In turn, a support arm 116 connects the pad 114c to the leg 102b of the assembly 18, whereby the pad 114e supports a center portion of the opposite edge of the substrate 16. The numeral 113 designates the center of the opening 104 and is aligned with the pivot point 73, when the substrate 16 is mounted within the flux path assembly 18 as shown in FIG. 1A. The pivot point 73 forms the center of the silicon substrate 16 as shown in FIG. 2A. Similarly, the axis of the permanent magnet 26, shown in FIG. 1B as being of a cylindrical configuration, is also aligned with the center 113 and the pivot point 73.

The assembly 18 solves a thermal stress problem resulting from the different coefficients of thermal expansion of the silicon substrate 16 and the flux path assembly 18, i.e., the assembly 18 expands at a greater rate than the silicon substrate 16. Illustratively, the silicon substrate 16 has a temperature coefficient of expansion in the order of 2.5 PPM/° C., whereas the assembly 18 is made of a silicon steel (having a silicon content of 3%), which in turn exhibits a temperature coefficient on the order of 11 PPM/° C., which is considerably greater than that of the substrate 16. In the absence of thermal stress relief, the substrate 16 would tend to buckle, possibly break and/or separate from the assembly 18. If the substrate 16 warps, the critical alignment of the accelerometers 32a and b and its various parts will be thrown out of balance with the result that the desired compensation of extraneous motions applied to the sensor 10 will be defeated. As shown in FIG. 1E, each of the support arms 112a and b, and 116 is disposed perpendicular respectively to each of a corresponding plurality of radial stress lines 111a, b and c. Thus, as the assembly 18 expands and tends to place a radial stress on the arms 112a, b, and 116, their configuration as shown in FIG. 1E permits them to readily flex under the thermal stress rather than buckle or break the substrate 16. In addition, each of the mounting pads 114a, b, and c is connected to the substrate 16 by a resilient adhesive such as an epoxy.

As the temperature of the permanent magnet 20, the assembly 18 and the substrate 16 vary, the mounting structure provided by the assembly 18 and the relative positions of the permanent magnet 20 and the substrate 16 therewith ensure that as the substrate 16 and its assembly 18 expand at different rates, the relative positions or these elements with respect to the magnet 20 remain the same. Therefore, the accelerometers 32a and b remain in the same relative relationship with the permanent 20 and are exposed to a magnetic flux field of the same strength. If the magnet 20, the assembly 18 and the substrate 16 were mounted such that the magnet 20 could shift even to a small degree with respect to the accelerometers 32a and b, the flux emanating through the effective portions 92a and b and the conductive paths 60 associated with vibrating beams 54 and 56 would also vary, whereby any extraneous motion imparted to the accelerometers 32a and b, as well as the outputs derived from the conductors 60 of each of the accelerometers 32a and b, would differ from each other.

The arrangement as shown in FIG. 2A of the accelerometers 32a and b, their supporting flexures 34 and 36 and the interconnection therebetween by the link 72 provide equal and opposite dither motion to the accelerometers 32a and b, and isolate the substrate 16, its dither frame 30 and the accelerometers 32a and b from extraneous stress, such that error signals are not introduced by data processing into the resultant force signals F and rotational signals and permits data processing using the output of the accelerometers 32a and 32b by relatively simple differentiating and scaling techniques. Further, the structure of FIG. 2A may be implemented by micromachining techniques upon a silicon substrate 16, whereby the resultant structure is produced at a low cost and with a precision of which the prior art accelerometers were simply not capable. In turn, the extreme accuracy of construction afforded by micromachining techniques permits the relative placement of accelarometers 32a and b and its link 72 to a precision in the order of 40 micro inches. As a result of such accuracy, the accelerometers 32a and b are placed in precise balance with each other such that extraneous movements imposed upon the frame 30 do not upset this balance and introduce erroneous signals into the outputs of the accelerometers 32a and b as may be otherwise caused by even slight misalignment of the accelerometers 32a and 32b.

First, the accelerometers 32a and 32b are mounted upon opposing sides of the dither frame 30 by their flexures 34a and 36a and 34b and 36b, respectively. Each of the flexures 34 and 36 is formed from the silicon substrate 16 to a height equal to the width of the substrate 16, illustratively of 20 mils, and a thickness of 1.4 mil corresponding to the vertical dimension of the flexures 34 and 36 as shown in FIG. 2A. The length of each of the flexures 34a and b and 36a and b is selected to provide a spring rate relative to the mass of accelerometers, e.g., of 0.1 gram, that will cause the flexures 34 and 36 to flex in an "S-bend" when subjected to the dither motion. The spring rate of the flexures is proportional to T3/L3, where T is the thickness of the flexures 34 and 36 and L is the length thereof. The length L and thickness T of the flexures 34 and 36 are set such that when dither motion is applied, the flexures 34 and 36 then flex in an S configuration, as shown in FIG. 2A. Such "S-bend" flexures 34 and 36 permit the accelerometers 32a and b to translate with predominantly linear motion, i.e., the vibrating beams 48a and 48b (as well as the other elements) of accelerometers 32a and 32b remain substantially parallel to each other as they are dithered along the dither axis 41. In addition, the flexures 34 and 36 permit accelerometers 32a and 32b to move in a predominantly linear fashion with only an insignificant nonlinear frequency component imposed thereon.

The link 72 mechanically interconnects the first and second accelerometers 32a and b so that any motion include dithering motion and extraneous motions applied to one of the accelerometers 32, will also be applied in precisely equal and opposite fashion to the other accelerometer 32. In this fashion, the outputs of the accelerometers 32a and b may be processed simply by sum and difference techniques to provide a force signal F and the rotational signal, as well as to cancel out erroneous signals. Without the link 72, the accelerometers 32a and 32b would operate at different frequencies due to slight mass mismatch of the proof masses 40. If driven at a common frequency, the accelerometers 32a and 32b would without the link 72 operate out of phase with each other (other than 180°).

The configuration and the manner of mounting the link 72 are effected to permit the link 72 to effectively pivot about the pivot point 73 intersecting an axis passing through the lever arms 74a and b. The pivot point 73 is disposed at a selected point along the length of the pivot flexure 82. As shown in FIG. 2A, the bottom end of the pivot flexure 82 is affixed to the support member 84 and extends vertically along the dither axis 41. The length of the pivot flexure 82 is selected, e.g., 100 mils, to impart a simple bending thereto, whereby that portion from the pivot point 73 to the point of interconnection to the link 72 is permitted to flex about the pivot point 73, while the remaining portion of the flexure 82 between the pivot point 73 and the support member 84, flexes in a smooth arc. In this fashion, the end points of the link 72 are disposed a radial distance from the pivot point 73 equal to the effective radius of rotation provided by the "S-bend" flexures 34 and 36 for the accelerometers 32a and 32b.

As indicated above, the length of the pivot flexure 82 is determined so that it flexes with only a simple arc bending. To accommodate a pivot flexure 82 of the desired length, it is necessary to configure the link 72 with a U-shaped configuration comprised of the parallel members 76a and b and the interconnecting member 78. In addition, a portion of the support member 84 is removed to provide a cut out 85, whereby the length of the pivot flexure 82 is set to provide the simple bend motion.

The vertically oriented flexures 80a and b as shown in FIG. 2A are dimensioned and, in particular, their lengths are set such that they exhibit 50% simple arc bending and 50% "S-bend" motion. Opposite ends of the vertical struts 80a and b are respectively interconnected between an edge of one of the accelerometers 32a and b and an end of one of the link members 74a and b. Portions of the link 72 and the accelerometers 32 are removed to provide cutouts 71 and 139, respectively, so that the precise length of the flexures 80a and b is determined to ensure that the flexures 80 have characteristics of 50 percent simple motion and 50 percent "S-bend" motion. Further with such characteristics, it is assured that any motion imparted by the flexures 80 to one of the accelerometers 32 is imparted as a sinusoidal function to the other without introducing a higher order harmonic into the translation motion. Without such flexures 80 and the link 72, the dither motion as well as other extraneous motion applied to the substrate 16, could impose high order harmonic motion to the accelerometers 32a and b, whose outputs upon demodulation would bear an undesired bias signal.

As indicated above, the flexures 34 and 36 are made of such dimensions and, in particular, their length such that they flex with an "S-bend". In particular, one end of each of the flexures 34 and 36 is respectively affixed to the inner periphery of the dither frame 30 and the other end to the accelerometer 32. An external edge portion of the accelerometer support frame 42 is removed to provide a cut out 33 so that the length of the flexures 34 and 36 is critically set to provide the desired "S-bend" motion and so that the other end of the flexures 34 and 36 are connected to a midpoint of the horizontal edges of accelerometers 32a and b. As shown in FIG. 2A, the flexures 34 and 36 support accelerometers 32a and b so that their centers of gravity 50 and the pivot point 73 lie along the central axis of the substrate 16 so that the center axis coincides with the dither axis of 41.

The "S-bend" flexures 34 and 36 have respectively pivot points 35 and 37, which are disposed a distance ⅙th of the flexure length from the inner periphery of the dither frame 30. The "S-bend" flexures 34 and 36 form respectively an effective radius from their pivot points 35 and 37 to their points of connection with their support frames 42. That effective radius equals to ⅚ of the length of the flexures 34 and 36, which in turn precisely equals the radius provided by the lever arms 74 from their pivot point 73 to the points of interconnection of the upright flexures 80a and b to the extremities of the lever arms 74a and b. By providing the link 72 and the accelerometers 32a and b with equal radii of rotation about the respective pivot points 73, and 37 and 35, it is assured that the link 72 will provide equal and opposite motion to the accelerometers 32a and b. As a result, if any extraneous noise is applied to one of the accelerometers 32a and b, a like and opposite motion will be applied to the other, so that upon processing any noise in the outputs of the accelerometers 32 is effectively removed by sum and difference techniques.

Upon application of the dithering motion to the accelerometers 32a and b, the "S-bend" flexures 34 and 36 move up and down in a substantially parallel relationship to each other due to the "S-bend" flexing of their flexures 34 and 36. Each flexure 34 and 36 has a center point 239 and 240, respectively. The bending motion resembles two smooth curves, the first terminating at the center point in one direction and the second curve with an opposite curve meeting the first at the center point. The "S-bend" flexures ensure that the horizontal and vertical edges of the support frames 42a and b remain precisely parallel with the inner horizontal and vertical peripheral edges of the dither frame 30.

As indicated above, the "S-bend" flexures 34 and 36 provide an effective rotation of the accelerometers 32a and b about their pivot points 35 and 37. In an illustrative embodiment, the commonly applied dithering forces move accelerometers 32a and b through a positive and negative angular rotation with respect to their rest positions, whereby the center of gravities 50a and b move from the center axis of the substrate 16 a distance of only 37 microinches for a dithering motion having an amplitude of 1 mil along the dithering axis 41.

The construction of accelerometers 32a and b from the silicon substrate 16 results in extremely close alignment of the accelerometers 32. This results from the high degree of flatness of the silicon substrate 16 and the relative proximity of the accelerometers 32a and b micromachined from the substrate 16. The flexures 34, 36, 80 and 82 are produced by etching near the surfaces of the substrate 16. Such micromachining ensures that the input axes 38a and b will be precisely perpendicular to the dither axis 41, at least as good as the flatness and parallel relationship of the surfaces of the silicon substrate 16, which can typically be achieved to a high degree. Thus, this invention achieves close alignment of the input and dither axes 38 and 41, thus overcoming the problem of prior art Coriolis sensors with regard to such alignment. The suspension of the accelerometers 32a and b by their flexures 34a and 36a, and 34b and 36b from opposing sides of the dither frame 30 so that their input axes 38a and b point in opposite directions and the use of the link 72 provide excellent nonlinearity motion cancellation.

The well known Eular-Buckling curves represent the structural tensioning and compression characteristics of the accelerometers their vibrating beams 54 and 56. The back-to-back orientation ensures that when the vibrating beams 54 and 56 of the accelerometer 32a are in tension, the beams of the other accelerometer 32b are in compression, and vice versa. As will be explained, the outputs of the accelerometers 32a and 32b are summed together to provide an indication of linear acceleration. This orientation insures that the beams 54 and 56 are operating in complementary portions of these curves and the summed outputs of the accelerometers 32a and b provide an accurate indication of the linear acceleration by canceling the higher order non-linearities of the vibrating beams 54 and 56. In addition, extraneous movements acting on the accelerometers 32a and b will at least to a first order of measure, tend cancel or dampen each other, whereby extraneous signals do not appear in the summed accelerometer outputs. In an analogous fashion when the difference of the accelerometer outputs is taken, the canceling characteristics of these curves ensure that second order nonlinearities in the resultant angular rotation signal will also average.

The construction of the two accelerometers 32a and b from the silicon substrate 16 offers other advantages. First, the configuration and the dimensions of the accelerometers 32, the various flexures and the link 72 may be determined with an extreme degree of accuracy, e.g., 40 microinches, so that the relative position of these elements is controlled to a like degree. Second, the construction of the flexures in the plane of the silicon substrate 16 ensures that the accelerometers 32 are dithered in that plane. As noted above, the link 72 ensures that the accelerometers 32a and b move in equal and opposite directions under the influence of the applied dithering motion. Thus, the centers 50a and b of gravity of the accelerometers 32a and b are placed precisely upon the center axis of the substrate 16, which is aligned with the dither axis 41 with a high degree of precision, whereby the dither motion caused by the current passing through the drive coils a and b causes the dithering motion to be applied precisely along the center axis of the substrate 16. Such accuracy ensures that extraneous motions otherwise resulting from the dither motion are not imposed upon the accelerometers 32a and b.

Secondly, the suspension of accelerometers 32a and b by the "S-bend" flexures 34 and 36, which are also formed in the plane of the silicon substrate 16, produces a motion of the accelerometers 32a and b of relatively small, opposing arcs as a result of this dithering motion. In one illustrative embodiment, dithering at maximum displacement (amplitude) of 1 millinch (corresponding to 1 degree of the total peak to peak angular travel), displaces the accelerometers 32a and b from their center axis by a mere 37 microinches. During a single cycle of motion of each of the accelerometers 32a and b up and down along the dither axis 41, each accelerometer 32 is subjected to 2 translations as it rotates about its effective radius provided by its flexures 34 and 36. However, since these double translations or "bobbings" occur within the plane of the silicon substrate 16 and not along the input axes 38a and b, the problems that have occurred with the prior art sensors of parallelogram configuration are avoided. First, a corresponding double frequency error signal is not imposed upon the inputs of the accelerometers 32, which required a phase servo adjustment in the processing as described in U.S. Pat. No. 4,799,385. Second, there is no need to offset the center of oscillation or to couple turn-around acceleration into the accelerometer input axis. As a result, for any position of the accelerometers 32a and b during their dithering motion, there is very little double frequency motion imposed upon their input axis 50, thus, there is no need to "steer" out the misalignment by adding a bias to the dither drive signal.

The various features of the silicon substrate 16 may be micromachined by various techniques well known in the prior art such as a wet chemical etch or a dry chemical etch such as plasma etching, sputter etching or reactive ion etching. For a detailed discussion of such techniques, reference is made to the following publications, which are incorporated herein by reference: VLSI Fabrication Principles by Sorab K. Ghandhi and Silicon Processing for the VLSI Era. Vol. 1—Process Technology by S. Wolf & R. J. Tauber.

In this illustrative embodiment of the silicon substrate 16, the maximum misalignment of the accelerometers 32 from the substrate center axis would be less than 0.1 mrad. This has the benefit of not fully imposing second harmonic distortion resulting from the dither drive into the rotational component signal outputted by the accelerometers 32a and b. Otherwise, as is disclosed by the prior art parallelogram drive arrangements, such second harmonic drive distortion could be multiplied by the squaring action of double dipping to generate primary and third harmonics, which can be coupled into the rate channels as error. These errors are avoided by the side-by-side placement and accurate micromachining of the accelerometers 32a and b within the substrate 16.

As noted above, each of the accelerometers 32a and b is suspended by "S-bend" flexures 34 and 36, which provide effective radii of rotation equal to that radius provided by the link arms 74a and b; without such construction, the accelerometers 32a and b would dither with a non-sinusoidal motion, which would introduce high order harmonic distortion in the rate signal. It is contemplated that there will be some coupling due to the offset of the input axis 38 resulting from the centers 50 of gravity being disposed above the flexures; however, such coupling is minor compared to that introduced by the parallelogram structures of the prior art.

Figure 3A:
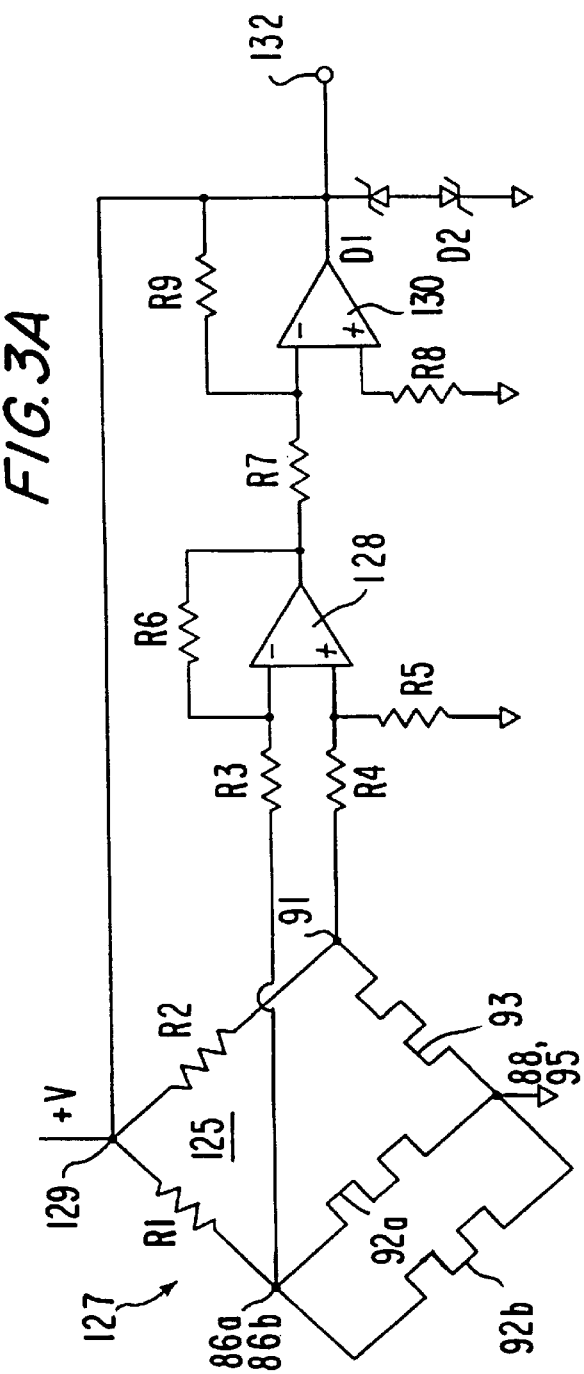
FIG. 3A is a circuit diagram of a first embodiment of an oscillator circuit for providing drive signals to the drive coils of the accelerometers shown in FIG. 2A.

Referring now to FIG. 3A, there is shown a dither drive circuit 127 for providing a sinusoidal voltage to be applied across the effective portions 92a and b. The conductive path 92 forms the first effective portion 92a for imparting a vibrating motion to the accelerometer 32a and the second effective portion 92b for imparting a vibrating motion to the accelerometer 32b. The center point of the conductor 92 is connected to ground via the conductor 92c and a ground terminal 88. As shown in FIGS. 1A and 1D, a magnetic field is generated perpendicular to the surfaces of the substrate 16 and is focused by the pole piece 22 through the accelerometers 32a and 32b. Illustratively, the conductor 92 takes the form of a deposit of gold. In an illustrative embodiment of this invention wherein the length of the conductor 92 extending between terminals 86a and 88 (or 86b and 88) is approximately 1 inch and is deposited to a depth of 1μmeter and a width of 10μmeter, the resistance offered by such a length of the conductor 92 is in the order of 100 ohms. When the magnetic flux crosses the conductive path 92, a voltage is induced thereacross of approximately 0.5 volt, which is approximately 2500 times the voltage amplitude of the velocity signal which is outputted by the dither drive circuit 127 of FIG. 3A on its output 86 and 91. To effectively remove this resistance voltage, a bridge 125 shown in FIG. 3A is employed with one leg thereof being formed by the effective portions 92a and b connected in parallel, and a second leg by a reference conductor 93 which is disposed on the dither frame 30 and has ends connected to terminals 91 and 95, as shown in FIG. 2A. The effective portions 92a and b are connected in parallel by connecting the terminals 86a and b together; in turn, the terminal 88 forms one node of the bridge 125 and the connected terminals 86a and b another node. The conductive path 92 forms the two effective portions 92a and b connected, with the interconnecting portion of conductor 92 being connected via the conductive path 92c to the ground terminal 88. The effective portions 92a and 92b are connected in parallel to form one leg of the bridge 125. The other leg of the bridge 125 is formed of the reference conductor 93 having one-half the length of the conductor 92 between the terminals 86a and 88 (or 86b and 88), e.g., one-half inch. The reference conductor 93 is made of the same material as that of conductor 92, e.g., gold, and is deposited to a like depth, whereby a like voltage, e.g., 0.5 v, is developed across both of the parallel connected effective portions 92a and b, and the reference conductor 93. A single drive voltage is applied from a first bridge node 129 to ground, whereas an output of the bridge 125 as developed across bridge nodes 86 and 91 is taken and applied to a first operational amplifier 128, which subtracts the voltage developed across the reference conductor 93 from that developed across the parallel connected effective portions 92a and b. A second operational amplifier 130 provides the remaining gain to boost the output of the first operational amplifier 128 to approximately 2.5 v peak at the output 132. A feedback path is connected to the bridge circuit 125 providing position feedback plus an excess phase shift due to the high-order operational amplifier poles, whereby an oscillating circuit is established to provide the sinusoidal signal to drive the effective portions 92a and b. The output 132 is clamped by a pair of Zener diodes D1 and D2 connected in opposition between the output 132 and ground, to clamp the output 132 and thereby stabilize the drive signal applied to the effective portions 92a and b.

Figure 3B:
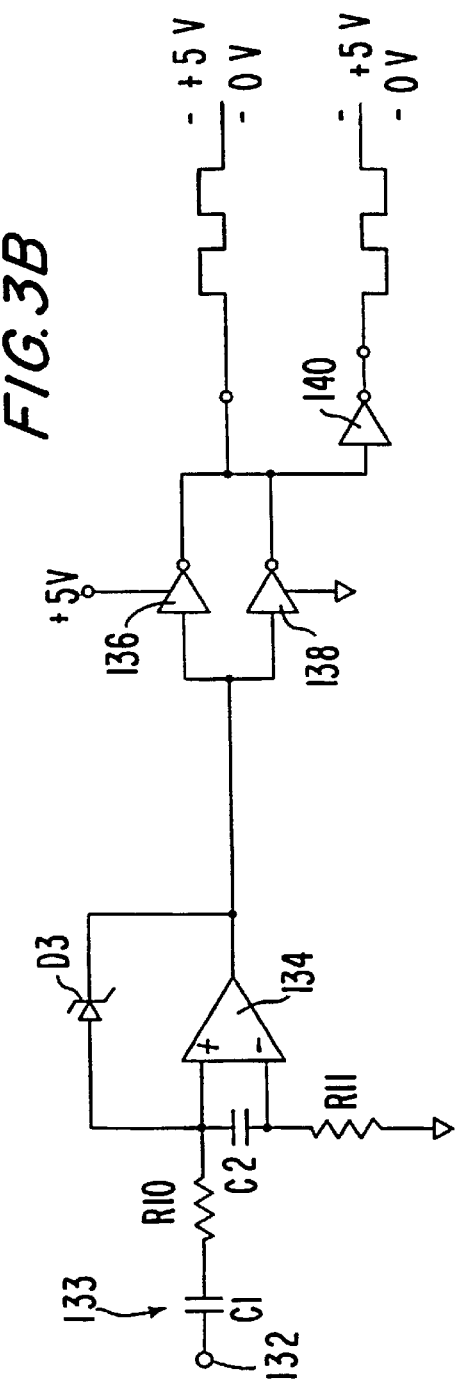
FIG. 3B is a circuit diagram responsive to the velocity out put signal of the circuit shown in FIG. 3A for gating the output signals from the accelerometer into counters.

As shown in FIG. 3B, the velocity signal appearing on the output 132 of the dither drive circuit 127 is applied to a zero-crossing detector circuit 133, whose outputs are used to gate the counters for counting the crystal clock signal, whereby the Coriolis rate signal and acceleration force signal can be demodulated. The velocity signal is coupled to an operation amplifier 134 by a capacitor C1 and resistor R10 to generate a zero-crossing signal. The open loop gain of the operational amplifier 134 "squares" the velocity signal and applies the "squared" signal to a pair of CMOS logic gates 136 and 138 connected in parallel with each other; these gates effect a voltage shift of the signal to levels compatible with the counters, e.g., 0 to + or −5 v. Another inverting logic gate 140 inverts the signal. The signals illustrated in FIG. 3B are applied to the counters 152 and 154, as shown in FIG. 3D, to count a signal indicative of the resonant, natural frequency for each half cycle of the dithering frequency f, whereby the Coriolis rate component is demodulated by inverting every other sample. As described in detail in U.S. Pat. No. 4,590,801, the acceleration is the sum of each such sample.

Referring now to FIG. 3C, there is shown an alternative embodiment of the dither drive circuit 127', which provides a dither drive signal across the external connectors 86a and 86b to the effective portions 92a and b. As described above, a magnetic field is generated and directed by the magnet 20 and its flux path assembly 18 perpendicular to the surfaces of the substrate 16 and the effective portions 92a and b disposed thereon, whereby a force is generated by the current flowing through the effective portions 92a and b to move the accelerometers 32a and b in a substantially rectilinear, vibrating movement up and down along the dither axes 41 as shown in FIG. 2A. The accelerometers 32a and b vibrate or dither at the frequency f determined by the mechanical characteristic including the spring rates of the flexures 34, 36, 80 and 82 the mass of the accelerometers 32a and b. The dither drive signal outputted by the dither drive circuit 127' is of a frequency corresponding to the frequency f of dither vibration and, as explained above, is used in the further processing of the accelerometer outputs to demodulate those signals to provide a force signal F and a rotational signal. Further, a wire (not shown) is disposed on the opposite side of the substrate 16 (from that shown in FIG. 2A) and forms first and second pick-off portions 92a' and 92b'. The interconnection of the pick-off portions 92a' and 92b' deposited on the opposite side to ground 35 is more clearly shown in FIG. 3C. As accelerometers 32a and b are vibrated, the pick-off portions 92a' and b' move through the magnetic field created by the unitary magnet 20 and its assembly 18, a current is induced therein and the resultant voltage is applied via resistors R11 and R12 to a pair of operational amplifiers 142 and 144 to be successively amplified with a relatively high gain, before being applied as the dither drive signal to the effective portions 92a and b. Zener diodes D4 and D5 serve to clamp the dither drive voltage as derived from the output of the operational amplifier 144 to a known voltage level.

The configuration of the accelerometers 32a and b within their silicon substrate 16 and the flux path assembly 18 and its unitary magnet 20 develop a considerable force in excess of that minimum turn-around acceleration required to effect the dither motions of accelerometers 32a and b. It is understood in the art that a minimum turn-around acceleration is needed to cause each of the accelerometers 32a and b to stop going in one direction and to accelerate in the opposite, whereby the dithering motion may occur. The acceleration force F tending to cause the dithering motion of accelerometers 32a and b is set out by the following equation:

$$F = mg = l \cdot i \times B \tag{1}$$

where i is the current passing through the conductive path 92 making up the effective portions 92a and b, $l$ is the effective length of that portion of the conductive path 92 within the magnetic flux passing through the accelerometers 32a and b, i.e., the length of the effective portions 92a and b, and B is the magnitude of the flux. In an illustrative embodiment of this invention, a current of 5 milliamp may be applied to each of the effective portions 92a and b, the effective portions 92a and b may have an effective length $l$ of 6 mm and 8 kilogauss may be readily provided bit the magnet 20 and its assembly 18. Solving equation (1) for mass m, where g is the universal gravity constant, it is shown that a force of 2.4 milligrams may be readily developed by this illustrative embodiment. In such an embodiment, the resonant frequency of the dithering motion imposed upon the accelerometers 32a and b is approximately 500 hz and a displacement D of accelerometers of 1 milliinch. The drive acceleration a may be calculated by the following:

$$\alpha = D(2\pi f)^2 / K \tag{2}$$

where D is the displacement, f is the dither frequency and K is a conversion factor. The calculated force for 1 millinch of displacement D at 500 Hz is 25 g's peak acceleration. Where the mechanical gain of the spring mass system formed by accelerometers Q is set at a is modest value of 1,000, the force developed by the interaction of a current passing through the conductive path 92 and the magnetic flux directed through the accelerometers 32, is 0.025 g's (25 g's/1,000). This force is sufficient to accelerate the calculated mass force of 0.024 grams. It is noted that the Q of pure crystals may be as high as 10,000, demonstrating that the dithering system described above is more than capable of developing sufficient force to effect the required dithering drive motion.

The following calculations demonstrate that the values of $\epsilon$, the voltage induced in the pick-off portions 92a' and 92b', is relatively high compared to the noise found in those operational amplifiers as would be incorporated into the drive circuit 127', as shown in FIG. 3C. Values of $\epsilon$ are provided by the following equation:

$$\epsilon = V \times B \cdot_l \tag{3}$$

where v is the amplitude o the velocity output signal of the accelerometers 32, B is the strength of the magnetic field crossing the effective portions 92a and b, is the effective length of the conductor within the magnetic flux field. For a dither displacement D of 1 milliinch, a natural frequency of accelerometer of 500 Hz, a velocity signal v of approximately 8 cm/sec., a length of the effective portions 92a and b of 6 mm, and a flux strength of 8 kilogauss, the output of a single pick-off portion 92a' is 0.4 mv. If the outputs of accelerometers 32a and b are connected in series, the output voltage is doubled to 0.8 mv. An operational amplifier, as may be incorporated into the drive circuits of FIGS. 3A and C, typically has a noise of 0.1 $\mu v$ for a bandwidth of 10K Hz. If the operational amplifier has again of $3 \times 10^3$, its output may typically be 2.4 v peak, providing a noise to peak signal ratio of 0.01%, which is a good indicator that the sensor 10 of this invention is a good velocity sensor for the inherent of noise level found in the available operational amplifiers.

The accuracy with which the rate and acceleration sensor 10 may be made, the symmetry of the accelerometers 32a and b and their suspension by the flexures 34 and 36, and the interconnection of the link 72 to impose equal and opposite motions on the accelerometers 32a and b, have an accumulative effect to greatly simplify the processing of the accelerometer output signals, essentially reducing it to a cosine demodulation step. This can be done every hale cycle, since neither sine nor double frequency sine demodulation is needed as was the case with the parallelogram structures of the prior art. Basically, the outputs of accelerometers 32a and b are subtracted from each other to provide the linear acceleration signal and to average both signals while inverting every other sample to demodulate for the cosines to produce a rate of rotation signal ω. Neither an alignment servo nor a phase servo is needed for such processing thus increasing the band width of the rotational acceleration signal to be 1 KHz in one illustrative embodiment of this invention.

The rate and acceleration sensor 10 has a sensitivity to rotational acceleration imposed about its rate axis 39, i.e., the moment of each of accelerometers 32a and b about the rate axis 39, which acceleration sensitivity will introduce an undesired noise component in the subsequent demodulation processing of the accelerometer output signals. That noise component can be effectively eliminated by differentiating the rotation rate signal ω and scaling it. In effect, as indicated above, the demodulated outputs of accelerometers 32 are a measure of its rotation rate signal ω, which can be differentiated to obtain an indication of the angular acceleration of each accelerometer 32. Since the dimensions and, in particular, the distance between the rate axis 39 and each of the centers 50a and b of gravity is known to a high degree of precision, e.g., 40 microinches, that equivalent radius of rotation is multiplied by a measured angular acceleration force to obtain an accurate indication thereof of the linear acceleration caused by the angular acceleration. The calculated acceleration moment is subtracted from the accelerometer outputs to reduce or substantially eliminate such acceleration sensitivity.

Referring now to FIG. 3D, there is shown how the output signals f1 and f2 as derived from the respective drive circuits 127a and c are processed and, in particular, are applied respectively to counters 152 and 154. As explained above, as the vibrating beams 54 and 56 are placed in tension or in compression due to accelerations being applied along the force sensing axes 38 of the respective accelerometers 32, the frequencies of the output signals f1 and f2 change. The dither drive circuit 127b may preferably take the form of that circuit shown in FIG. 3C or alternatively FIG. 3A. The drive circuits or signal generators 127a and c may illustratively take the form of that circuit shown in FIG. 3A.

The dither drive circuit 127b provides an output signal, which is applied to the gating circuit 133 as discussed above with regard to FIG. 3B. The output of the gating circuit 133 is a pair of squared gating signals which are applied to the counters 152 and 154. This pair of gating signals occur at the velocity zero-crossings to gate the counters 152 and 154. This is approximately a reading at 1 kHz or both edges of the velocity zero-crossings. The counters 152 and 154 count the frequencies of the accelerometer output signals f1 and f2 with respect to a reference clock signal generated and applied by a reference clock 150 to each of the counters 152 and 154. In turn, a microprocessor reads the output of the counters 152 and 154 at an illustrative frequency of 1 kHz and process these counts to provide an indication of Δv and Δθ.

As explained in detail in commonly assigned U.S. Pat. No. 4,786,861, Δv is provided by the following equation:

$$\Delta v_i = A[(N1_i - N2_i) + FT + B(N1_i + N2_i)] \quad (4)$$

where vi is the "ith" sample of the velocity signal, A and F are scale factors, $N1_i$ is the count derived from the counter 152 over a 1 kHz (1m sec) period for the "ith" sample, $N2_i$ is the count obtained from the counter 154 for the "ith" sample, T is the time period and B is the bias correction term. As well known in the art, $\Delta\theta_i$ is provided by the following equation:

$$\Delta\theta_i = a(\cos N1_i + \cos N2_i) + b(\cos N1_i - \cos N2_i) \quad (5)$$

where a is a scale factor and b is a bias/correction term, and $$\cos(N1_i) = N1_i - N1_{(i-1)}, \text{ over each 500 Hz period or} \quad (6)$$

$$\cos(N1_i) = (-1)^i N1_i, \text{ at 1 kHz rate.} \quad (7)$$

Angular acceleration α is equal to the linear acceleration as derived from the output of either of the accelerometers 32a or b, divided by the equivalent radius of rotation, $r_{eq}$ in accordance with the following equation:

$$\alpha = \frac{A_{linear}}{r_{eq}} \quad (8)$$

In turn, angular acceleration α is a function of the measured rotation rate ω in accordance with the following equation:

$$\alpha = \frac{d\omega}{dt} \quad (9)$$

In turn, the rotation rate may be expressed as follows:

$$\omega = \frac{\Delta\theta}{\Delta t} \quad (10)$$

Since the derivative of the rotation rate ω is equal to acceleration α, acceleration may be expressed by the following equation:

$$\alpha = \frac{\omega_i - \omega_{(i-1)}}{\Delta t} = \frac{\frac{\Delta \theta_i}{\Delta t} - \frac{\Delta \theta_{(i-1)}}{\Delta t}}{\Delta t} \quad (11)$$

Thus, correction for linear acceleration $A_{linear}$ is provided by the following equation:

$$A_{linear correction} = \alpha r_{eq.} = r_{eq.} \frac{\frac{\Delta \theta_i}{\Delta t} - \frac{\Delta \theta_{(i-1)}}{\Delta t}}{\Delta t} \quad (12)$$

In turn, the microprocessor 156 is programmed in a conventional fashion to subtract values of $A_{linear\ correction}$ from the accelerometer outputs f1 and f2 to correct for angular acceleration.

FIG. 4 shows a plan view of one embodiment of a rate and acceleration sensor 200 including a link 210 according to one embodiment of the present invention. Link 210 comprises a simple rectangular beam 212 which is formed in the substrate material and in the two epitaxial layers 214 formed on opposing parallel surfaces of the substrate. Rectangular beam 212 is inherently balanced and axes-symmetric about its geometric center which is also the center of mass of rectangular beam 212. Thus, the simple rectangular shape of rectangular beam 212 may be analyzed using classical methods commonly known to those of skill in the art. Link 210, including rectangular beam 212, minimizes mass while providing stiffness equal to or greater than that of the complex asymmetrical shape of the prior art.

In one preferred embodiment, a rectangular beam 212 is formed in an axis which is parallel to the rate axis 216 and normal to dither axis 218. Link 210 is mechanically connected to accelerometers 220 by dither axis flexures 222 such that the geometric center of rectangular beam 212 is intermediate between dither axis flexures 222. Link 210 further comprises eight epitaxial struts or legs 224 (four shown) which form an 'X' shape. The intersection of 'X' struts 224 is essentially centered at the geometric center of rectangular beam 212. The ends of 'X' struts 224 opposite the intersection point connect to either of two solid cantilevered frame members 226 formed in the substrate material. A first four epitaxial struts 224 are formed in first epitaxial layer 214 and a second four epitaxial struts 224 (not shown) are formed in second epitaxial layer 214.

The intersection point of 'X' struts 224 is both the geometric center and the center of mass of 'X' struts 224 by virtue of the symmetric 'X' shape of 'X' struts 224. Thus, 'X' struts 224 are inherently balanced and axes-symmetric about the intersection point of 'X' struts 224. In one preferred embodiment, both the geometric center and the center of mass of link 210 are located essentially at the geometric center and center of mass of rectangular beam 212, which is also the geometric center and center of mass of 'X' struts 224. Link 210, including rectangular beam 212 and 'X' struts 224, is thus inherently balanced and axes-symmetric about its own geometric center and center of mass by virtue of the location of 'X' struts 224 relative to rectangular beam 212.

In one preferred embodiment, struts 224 are formed at 45 degree angles to rate and dither axes 216, 218. Solid dither axis flexures 222 connect the ends of link 210 to the free moving ends of accelerometer blocks 220. Link 210, including rectangular beam 212 and epitaxial struts 224, provides reduced sensitivity to vibration in the dither cross-axis, having a cross-axis vibration sensitivity on the order of 4 or more times the dither frequency. Link 210 in combination with dither axis flexures 222 provides a linkage between accelerometer blocks 220 which pivots about the geometric center of rectangular beam 212 whereby the motion of one accelerometer block 220, including dither motion, is transmitted to the other accelerometer block 220 as a sinusoidal function without introducing a higher order harmonic into the translation motion. Thus, the dithering motion imparted to one accelerometer is of the exact same frequency and precisely 180 degrees out of phase with that applied to the other accelerometer.

Link 210, including epitaxial struts 224, can be fabricated in double-sided epitaxial silicon wafers by conventional wet etching processing using a back-biased voltage as an etch stop. For example, wet etching may be accomplished using a potassium hydroxide (KOH) based etchant known to those of skill in the art that takes advantage of the orientation-dependent properties of silicon to etch specific shapes in silicon, also known as KOH processing. Link 210, including rectangular beam 212 and epitaxial struts 224, is insensitive to process variations in any of the widths of dither axis flexures 222; the etch times for forming link 210, including rectangular beam 212 and struts 224; or the final width of struts 224. For a detailed discussion of KOH etching, reactive ion etching and other etching techniques, reference is made to the following publications, which are incorporated herein by reference: *VLSI Fabrication Principles* by Sorab K. Ghandhi and *Silicon Processing for the VLSI Era*, volume 1: *Process Technology* by S. Wolf and R. J. Tauber.

ALTERNATIVE EMBODIMENTS

Figure 5:
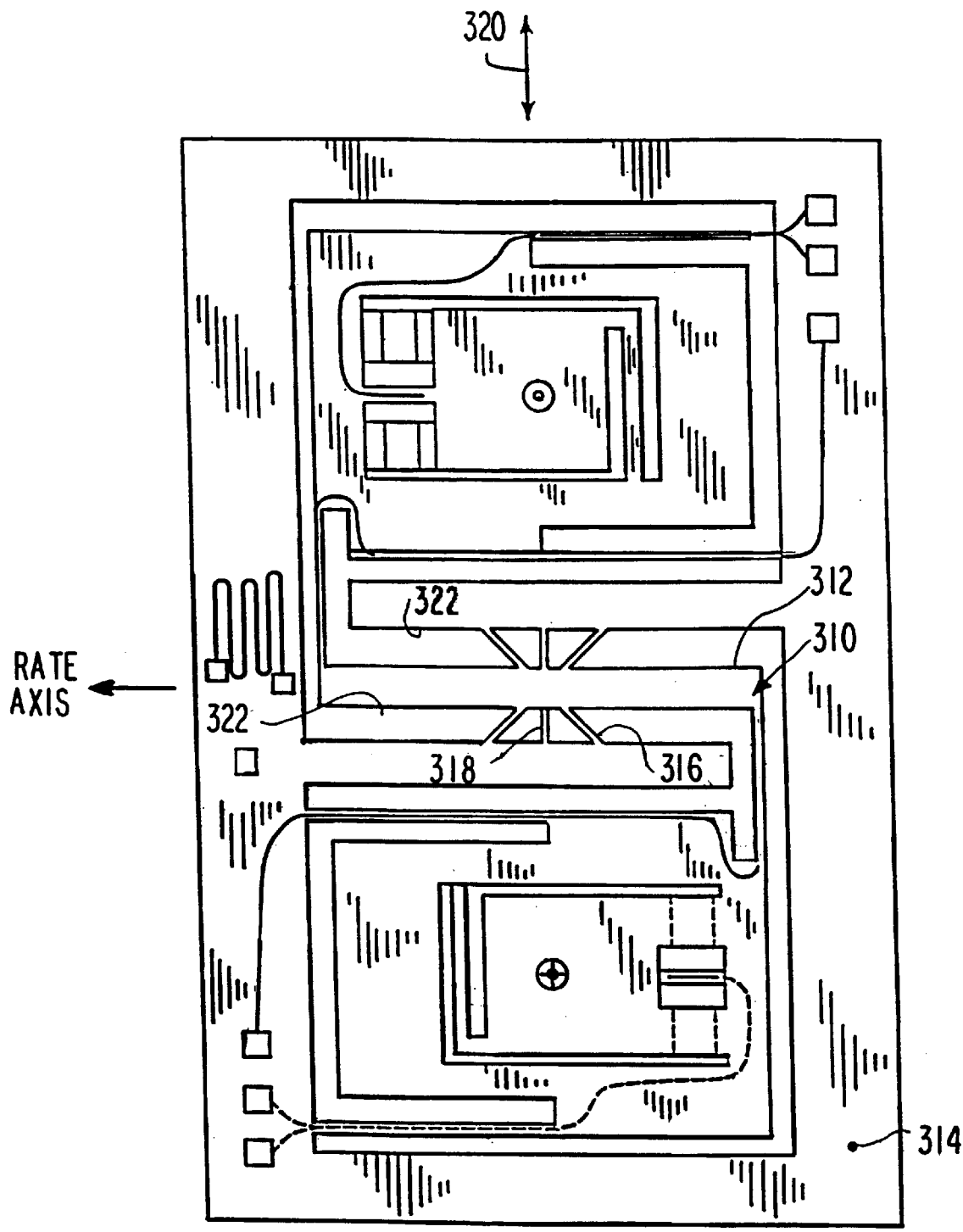
FIG. 5 is a plan view of a modified 'X' shaped link according to one embodiment of the present invention.

One alternative embodiment of the present invention is shown in FIG. 5. Link 310 comprises a rectangular beams 312 formed in the substrate and in the two epitaxial layers 314 formed on opposing surfaces of the substrate. Four 'X' struts or legs 316 of the configuration shown in FIG. 5 are formed in a first epitaxial layer 314. Two perpendicular struts or legs 318 are formed in the opposing epitaxial layer 314 along an axis parallel to the dither axis 320. Thus, link 310 comprises solid rectangular beam 312 formed in the substrate material and in two opposing epitaxial layers 314; four 'X' struts 316 formed in one epitaxial layer 314; and two struts 318 formed in the opposing epitaxial layer 314 essentially perpendicular to rectangular beam 312 at the approximate geometric center of rectangular beam 312. The ends of perpendicular struts 318 connect to rectangular beam 312 and to either of two solid cantilevered frame members 322 formed in the substrate material. As in the configuration of FIG. 4, the intersecting ends of 'X' struts 316 intersect rectangular beam 312 at the approximate geometric center of rectangular beam 312 and the ends of 'X' struts 316 opposite the intersection point connect to either of two solid cantilevered frame members 322. As in the configuration of FIG. 4, the geometric center and center of mass of rectangular beam 312 is also the geometric center and center of mass of link 310 about which link 310 is inherently balanced and axes-symmetric.

By providing 'X' struts 316 and perpendicular struts 318 which do not overlay one another in a plan view, link 310 may be fabricated using a combination of KOH etching and reactive ion etching. Perpendicular struts 318 are fabricated using KOH etching and back-biasing to ensure the integrity of epitaxial layer 314. Opposing epitaxial layers 314 are cleared from one another using KOH etching. Perpendicular struts 318 are then defined using a reactive ion etching operation on the substrate side of epitaxial layer 314 which improves strut definition, allows for the fabrication of thinner struts, and provides a link which pivots about the approximate geometric center of rectangular beam 312. Link 310, including 'X' struts 316 and perpendicular struts 318, increases stiffness over the configuration of FIG. 4 while providing the same relatively reduced sensitivity to vibration in the dither cross-axis. Link 310, including rectangular beam 312 and epitaxial struts 316, 318, is insensitive to process variations in any of the widths of flexures 322; the etch times for forming link 310, including rectangular beam 312, 'X' struts 316 and perpendicular struts 318; or the final width of either 'X' struts 316 or perpendicular struts 318.

Figure 6:
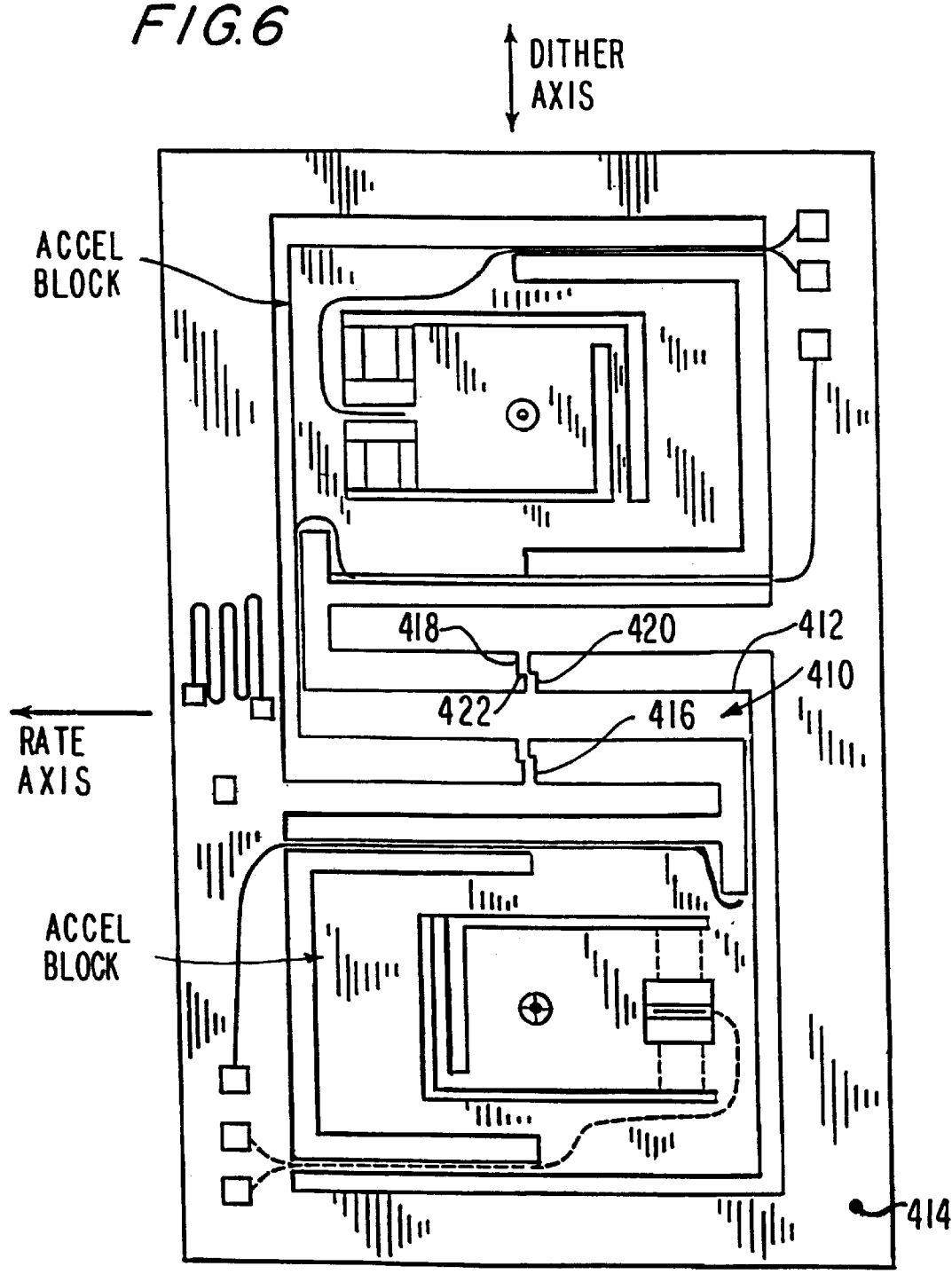
FIG. 6 is a plan view of a link having a "dog leg" shape according to one embodiment of the present invention.

FIG. 6 shows another alternative embodiment of the present invention. Link 410 comprises solid rectangular beam 412 formed in the substrate material and in the two epitaxial layers 414 formed on opposing surfaces of the substrate. Four struts or legs 416 are formed perpendicular to rectangular beam 412 at the approximate geometric center of rectangular beam 412, two formed in each opposing epitaxial layer 414. In one preferred embodiment, a first pair of perpendicular struts 416 formed in a first epitaxial layer 414 overlie the second pair of struts 416 formed in the second epitaxial layer 414 formed on the opposing surface of the substrate. In one preferred embodiment, each perpendicular strut 416 is formed having a jog or "dog leg." The "dog leg" is formed such that the two longitudinal portions 418, 420 are slightly offset from one another. In other words, the "dog leg" 422 formed between longitudinal portions 418, 420 has a finite length longer than the combined widths of longitudinal portions 418, 420. The "dog leg" aids in clearing the bulk silicon from between overlying struts 416. In one preferred embodiment, the "dog leg" is located at the approximate geometric center of perpendicular strut 416. As in the configuration of FIG. 4, the geometric center and center of mass of rectangular beam 412 is also the geometric center and center of mass of link 410 about which link 410 is inherently balanced and axes-symmetric. The configuration of FIG. 6 produces a link which pivots about the approximate geometric mid-point of rectangular beam 412 and provides the simplicity of analysis associated with the configurations of FIGS. 4 and 5, above.

Figure 7:
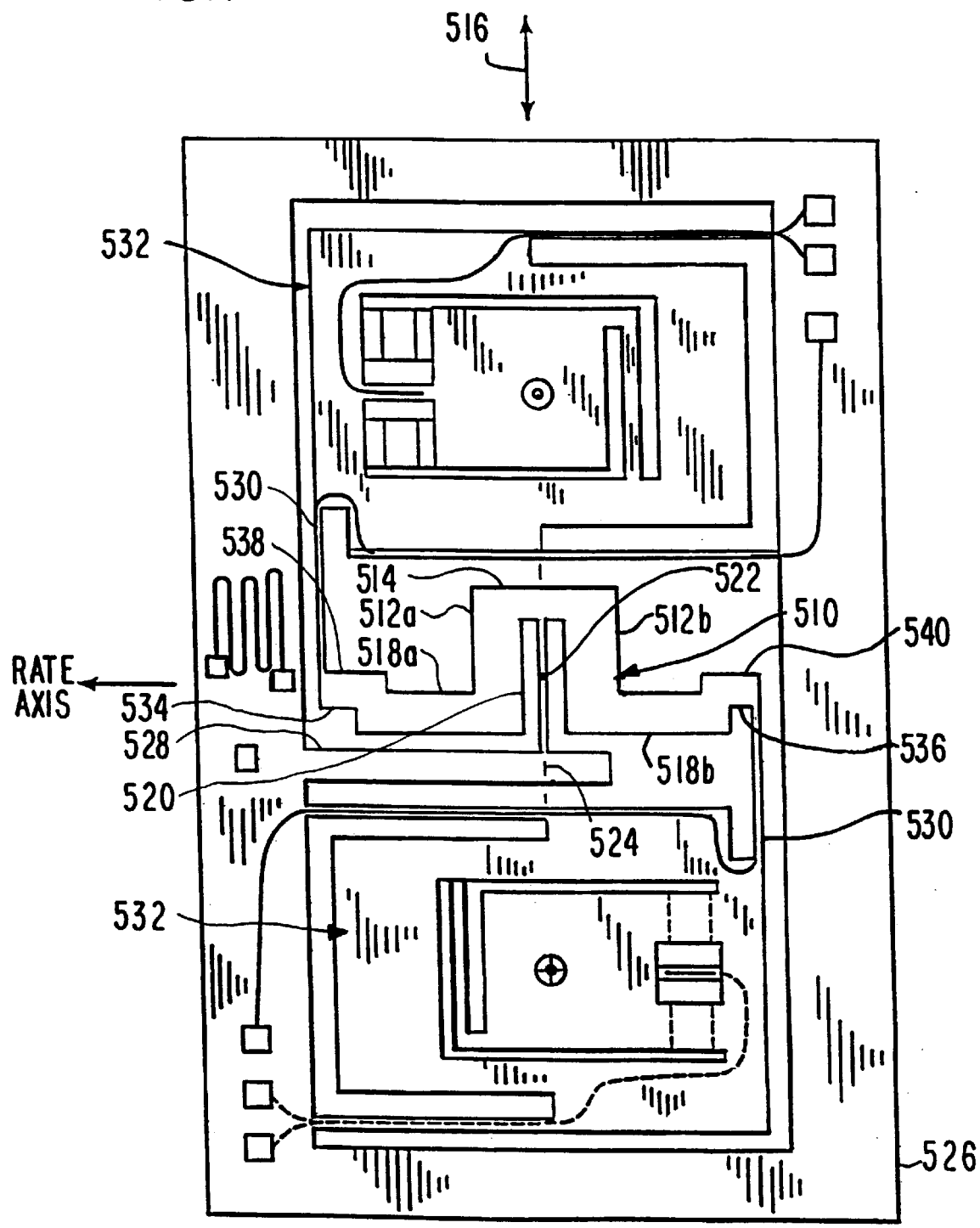
FIG. 7 is a plan view of a symmetric 'U' shaped link according to one embodiment of the present invention.

FIG. 7 shows another alternative link configuration. The link configuration of FIG. 7 is a symmetrical 'U' shape providing an analytically simplified configuration. Link 510 comprises a pair of parallel members 512a, 512b and interconnecting member 514. The lengths of parallel members 512a, 512b extending along the sensor's dither axis 516 are substantially equal. Parallel members 512a, 512b interconnect pivot arms 518a, 518b to interconnecting member 514 which is connected to pivot flexure 520. Link 510 resembles a lever pivotally mounted about a pivot point 522 provided by pivot flexure 520. Thus, link 510 is inherently balanced and axes-symmetric about an axis 524 parallel to the longitudinal axes of parallel members 512 and passing through the geometric center of interconnecting member 514. In one preferred embodiment, pivot flexure 520, including pivot point 522, is centered on axis 524. Thus, link 510 is inherently balanced and axes-symmetric about pivot flexure 520 and about pivot point 522.

Pivot flexure 520, and thus pivot point 522, is mounted along a center axis of frame 526 by a support member 528 which is, in turn, affixed to frame 526. The 'U' shape of link 510 accommodates both pivot flexure 520 and interconnecting dither axis flexures 530. First ends of flexures 530 are fixed to the ends of pivot arms 518 and second ends of flexures 530 are fixed to the moving ends of accelerometer blocks 532. Thus, link 510 is interconnected to each of two accelerometer blocks 532 by flexures 530. Link 510 in combination with interconnecting dither flexures 530 provides a linkage between accelerometer blocks 532 which pivots about pivot point 522. In a preferred embodiment, link 510 pivots about pivot point 522 disposed intermediate between interconnecting dither flexures 530.

Portions of link 510 are removed to provide cutouts 534 and 536 and portions are retained to form extensions 538, 540 such that the precise length of interconnecting dither axis flexures 530 is determined to ensure that flexures 530 have characteristics of 50 percent simple motion and 50 percent "S-bend" motion. As noted above, such characteristics ensure that any motion imparted by dither axis flexures 530 to one accelerometer block 532 is imparted as a sinusoidal function to the other accelerometer block 532 without introducing a higher order harmonic into the translation motion. In a preferred embodiment, the dimensions of cutouts 534, 536 and extensions 538, 540 are chosen such that link 510 is inherently balanced and axes-symmetric about pivot flexure 520 and about pivot point 522.

Figure 8:
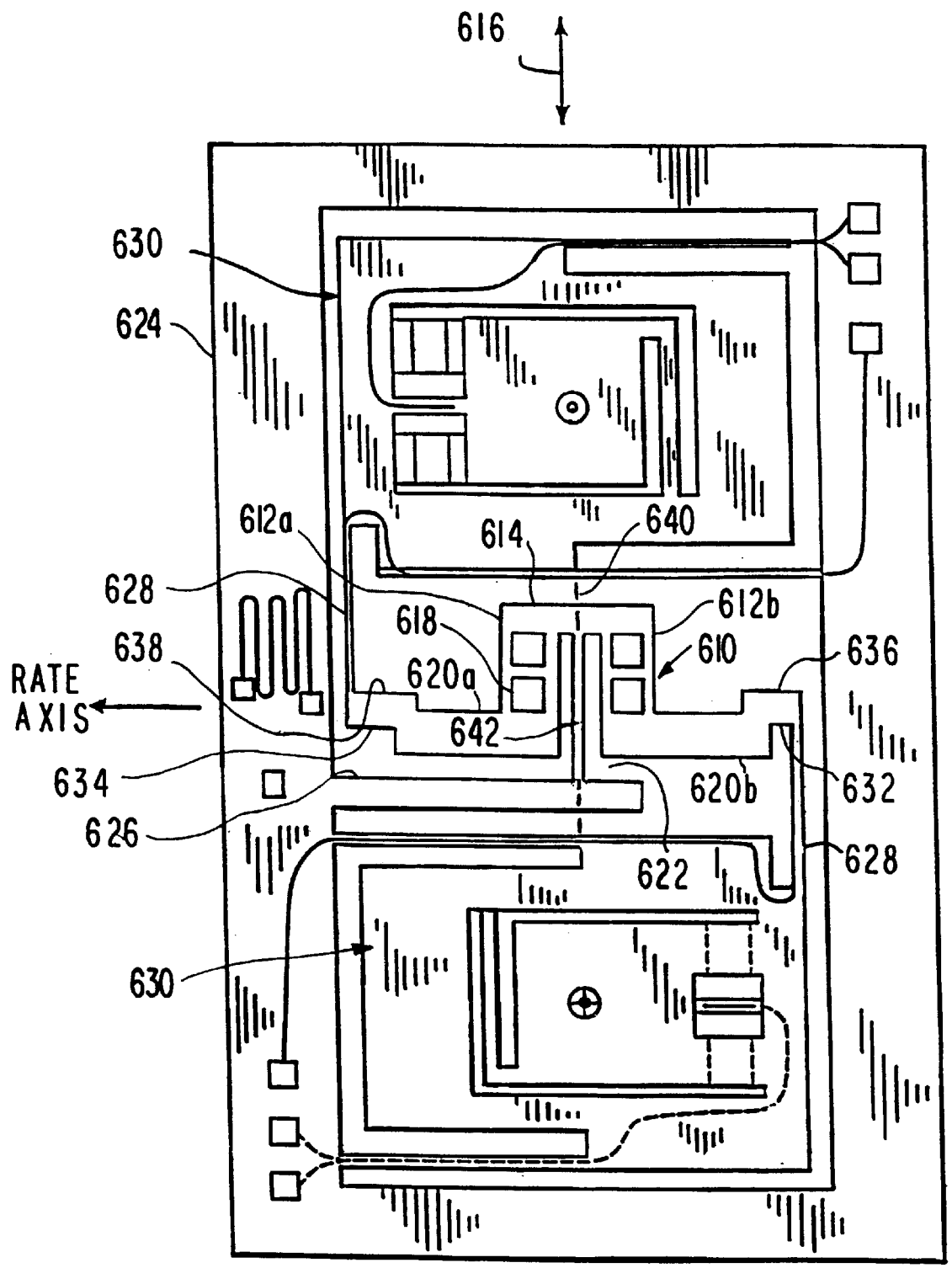
FIG. 8 is a plan view of a symmetric and mass reduced 'U' shaped link according to one embodiment of the present invention.

FIG. 8 shows another alternative link configuration comprising a mass reduced 'U' shaped link 610. The link configuration of FIG. 8 is another symmetrical 'U' shape which provides an analytically simplified configuration. Link 610 comprises a pair of parallel members 612a, 612b and interconnecting member 614. The lengths of parallel members 612a, 612b extending along the sensor's dither axis 616 are substantially equal. Portions of parallel members 612a, 612b are removed to form one or more cavities or through holes 618 which lighten or mass reduce link 610. Parallel members 612a, 612b interconnect pivot arms 620a, 620b to brace 614 which is connected to pivot flexure 622. In one preferred embodiment, four through holes 618 are formed in link 610, two in each of parallel members 612a, 612b. In turn, pivot flexure 622 is mounted along a center axis of frame 624 by a support member 626 which is, in turn, affixed to frame 622. The 'U' shape of link 610 accommodates both pivot flexure 622 and interconnecting dither axis flexures 628.

First ends of interconnecting dither axis flexures 628 are fixed to the ends of pivot arms 620 and second ends of flexures 628 are fixed to the moving ends of accelerometer blocks 630. Thus, link 610 is interconnected to each of two accelerometer blocks 630 by flexures 628. Portions of link 610 are removed to provide cutouts 632 and 634 and portions are retained to form extensions 636, 638 such that the precise length of dither axis flexures 628 is determined to ensure that dither axis flexures 628 have characteristics of 50 percent simple motion and 50 percent "S-bend" motion.

Thus, link 610 is inherently balanced and axes-symmetric about an axis 640 parallel to the longitudinal axes of parallel members 612 and passing through the geometric center of interconnecting member 614. In one preferred embodiment, pivot flexure 622, including a pivot point 642, is centered on axis 640. Thus, link 610 is inherently balanced and axes-symmetric about pivot flexure 622 and about pivot point 642.

FIG. 9 shows yet another alternative link configuration comprising a mass reduced 'U' shaped link 710. The link configuration of FIG. 9 is another 'U' shape which provides an analytically simplified configuration. Link 710 comprises a pair of parallel members 712a, 712b and interconnecting member 714. The lengths of parallel members 712a, 712b extending along the sensor's dither axis 716 are substantially equal. In one preferred embodiment, portions of parallel members 712a, 712b are removed to form one or more cavities or through holes 717 which lighten or mass reduce link 710. Parallel members 712a, 712b interconnect pivot arms 718a, 718b to interconnecting member 714 which is connected to pivot flexure 720. Link 710 resembles a lever pivotally mounted about a pivot point 722 provided by pivot flexure 720. Thus, link 710 is essentially balanced and axes-symmetric about an axis 724 parallel to the longitudinal axes of parallel members 712 and passing through the geometric center of interconnecting member 714. In one preferred embodiment, pivot flexure 720, including pivot point 722, is centered on axis 724. Thus, link 710 is essentially balanced and axes-symmetric about pivot flexure 720 and about pivot point 722.

Pivot flexure 720, and thus pivot point 722, is mounted along a center axis of frame 726 by a support member 728 which is, in turn, affixed to frame 726. The 'U' shape of link 710 accommodates both pivot flexure 720 and interconnecting dither axis flexures 730. First ends of flexures 730 are fixed to the ends of pivot arms 718 and second ends of flexures 730 are fixed to the moving ends of accelerometer blocks 732. Thus, link 710 is interconnected to each of two accelerometer blocks 732 by flexures 730. Link 710 in combination with interconnecting dither flexures 730 provides a linkage between accelerometer blocks 732 which pivots about pivot point 722. In a preferred embodiment, link 710 pivots about pivot point 722 disposed intermediate between interconnecting dither flexures 730.

Portions of link 710 are removed to provide cutouts 734 and 736 and a portion is retained to form extension 738 such that the precise length of interconnecting dither axis flexures 730 is determined to ensure that flexures 730 have characteristics of 50 percent simple motion and 50 percent "S-bend" motion. As noted above, such characteristics ensure that any motion imparted by dither axis flexures 730 to one accelerometer block 732 is imparted as a sinusoidal function to the other accelerometer block 732 without introducing a higher order harmonic into the translation motion. In the embodiment of FIG. 9, the configurations of cutouts 734, 736 and extension 738 are dictated by practical considerations of space and minimum cross-section such that link 710 is prevented from being precisely balanced and axes-symmetric about pivot flexure 720 and about pivot point 722. In a preferred embodiment, the configurations of cutouts 734, 736 and extension 738 are chosen such that a minimum discrepancy in configuration exist between pivot arms 718a, 718b and link 710 is substantially balanced and axes-symmetric about pivot flexure 720 and about pivot point 722.

The foregoing is illustrative of the present invention and is not to be construed as limiting thereof. The invention is defined by the following claims, with equivalents of the claims to be included therein.

What is claimed is:

1. Apparatus for measuring the specific force and angular rotation rate of a moving body, comprising:

a) a monolithic substrate having first and second substantially planar surfaces disposed substantially parallel to each other;

b) a first accelerometer formed of said substrate and having a first force sensing axis for producing a first output signal indicative of an acceleration of the moving body along said first force sensing axis, said first accelerometer having a proof mass, a support frame, and at least one flexure connecting said proof mass to said support frame;

c) a second accelerometer formed of said substrate and having a second force sensing axis for producing a second output signal indicative of an acceleration of the moving body along said second force sensing axis, said second accelerometer having a proof mass, a support frame, and at least one flexure connecting said proof mass to said support frame;

d) a dither frame formed of said substrate, said dither frame being of a rectangular configuration having first and third opposing members and second and fourth opposing members;

e) a first pair of S-bend flexures connected between said support frame of said first accelerometer and said dither frame, and a second pair of S-bend flexures connected between said support frame of said second accelerometer and said dither frame, each of said first and second S-bend flexures being formed of said substrate for mounting said first and second accelerometers such that said first and second force sensing axes are similarly oriented with respect to said first and second surfaces and such that said first and second accelerometers can be moved along a vibration axis perpendicular to each of said first and second sensing axes and passing through the geometric centers of said first and second accelerometers;

f) a link having first and second points connected respectively to said first and second accelerometers, a pivot point disposed between said first and second connected points and coincident with said vibration axis, and support means for affixedly disposing said pivot point with respect to said dither frame to permit said link to pivot thereabout and, when one of said first and second accelerometers is moved, to impart a substantially equal and opposite motion to an other of said first and second accelerometers;

g) a drive circuit coupled to each of said first and second accelerometers for imparting a dithering motion thereto of a predetermined frequency along said vibration axis; and h) said substrate having a rate axis perpendicular to each of said first and second force sensing axes and said vibration axis, whereby said first and second output signals have a Coriolis component indicative of the angular rotation rate of the moving body about said rate axis.

2. The specific force and angular rotation rate measuring apparatus recited in claim 1 wherein said pivot point is disposed intermediate between said first and second connected points.

3. The specific force and angular rotation rate measuring apparatus recited in claim 2 wherein said link is formed having a shape essentially symmetrical about said pivot point.

4. The specific force and angular rotation rate measuring apparatus recited in claim 3 wherein said link is formed having an essentially rectangular shape symmetrical about said pivot point.

5. The specific force and angular rotation rate measuring apparatus recited in claim 4 wherein said a monolithic substrate includes first and second epitaxial layers adhered to said first and second parallel surfaces, respectively.

6. The specific force and angular rotation rate measuring apparatus recited in claim 3 wherein said support means comprises a pivot flexure comprising said pivot point.

7. The specific force and angular rotation rate measuring apparatus recited in claim 6 wherein said pivot flexure has length and cross-sectional dimensions such that said pivot flexure flexes with a simple bend.

8. The specific force and angular rotation rate measuring apparatus recited in claim 7 wherein said link comprises first and second parallel members and a 'U' shaped member disposed therebetween and interconnecting said first and second parallel members.

9. The specific force and angular rotation rate measuring apparatus recited in claim 8 wherein said pivot flexure further comprises a distal end connected to said 'U' shaped member, whereby said pivot point is aligned with said first and second parallel beams in radial fashion.

10. The specific force and angular rotation rate measuring apparatus recited in claim 9 wherein said 'U' shaped member comprises first and second parallel leg members and an interconnecting member disposed therebetween and interconnecting said first and second parallel leg members, each of said first and second parallel leg members are formed with one or more cavities.

11. The specific force and angular rotation rate measuring apparatus recited in claim 9 wherein said 'U' shaped member comprises first and second parallel leg members and an interconnecting member disposed therebetween and interconnecting said first and second parallel leg members, each of said first and second parallel leg members are formed with one or more through holes.

12. The specific force and angular rotation rate measuring apparatus recited in claim 5 wherein said support means comprises:

first and second support members, one of said support members positioned on each side of and spaced away from said link;

first struts formed in said first epitaxial layer and connected between said link and said first support member; and second struts formed in said second epitaxial layer and connected between said link and said second support member.

13. The specific force and angular rotation rate measuring apparatus recited in claim 12 wherein said first struts and said second struts are axes-symmetric about said pivot point.

14. The specific force and angular rotation rate measuring apparatus recited in claim 13 wherein said first struts form a first 'X' shape having an intersection coincident with said pivot point; and said second struts form a second 'X' shape having an intersection coincident with said pivot point.

15. The specific force and angular rotation rate measuring apparatus recited in claim 14 wherein said first and second struts are formed at substantially equal angles to a longitudinal axis of said rectangular link.

16. The specific force and angular rotation rate measuring apparatus recited in claim 15 wherein said first and second struts are formed at forty-five degree angles to said longitudinal axis of said rectangular link.

17. The specific force and angular rotation rate measuring apparatus recited in claim 13 wherein said first struts form an 'X' shape having an intersection coincident with said pivot point; and said second struts comprise first and second beams projecting from first and second sides, respectively, of said rectangular link.

18. The specific force and angular rotation rate measuring apparatus recited in claim 17 wherein first and second beams project perpendicularly from said first and second sides of said rectangular link adjacent said pivot point.

19. The specific force and angular rotation rate measuring apparatus recited in claim 13 wherein said first struts comprise first and second beams projecting from first and second sides, respectively, of said rectangular link; and said second struts comprise third and fourth beams projecting from said first and second sides, respectively, of said rectangular link.

20. The link device recited in claim 19 wherein said first, second, third and fourth beams each comprise first and second longitudinal portions joined by a dog leg portion therebetween, said dog leg portion having a minimum length longer than the combined width of said first and second longitudinal portions.

21. The link device recited in claim 20 wherein the length of said first longitudinal portion is substantially equal to the length of said second longitudinal portion.

* * * * *